United States Patent
Wade

(10) Patent No.: US 9,910,765 B2
(45) Date of Patent: Mar. 6, 2018

(54) PROVIDING TESTING ENVIRONMENTS FOR SOFTWARE APPLICATIONS USING VIRTUALIZATION AND A NATIVE HARDWARE LAYER

(71) Applicant: Citrix Systems, Inc., Fort Lauderdale, FL (US)

(72) Inventor: Christopher Wade, Ocean Ridge, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 121 days.

(21) Appl. No.: 14/718,217

(22) Filed: May 21, 2015

(65) Prior Publication Data

US 2015/0339216 A1 Nov. 26, 2015

Related U.S. Application Data

(60) Provisional application No. 62/002,156, filed on May 22, 2014.

(51) Int. Cl.
G06F 11/36 (2006.01)
G06F 9/455 (2018.01)

(52) U.S. Cl.
CPC ...... *G06F 11/3688* (2013.01); *G06F 11/3664* (2013.01); *G06F 11/3668* (2013.01);
(Continued)

(58) Field of Classification Search
CPC ............. G06F 11/3672; G06F 11/3688; G06F 11/3664; G06F 11/3696; G06F 11/362;
(Continued)

(56) References Cited

U.S. PATENT DOCUMENTS 7,823,152 B2 * 10/2010 Bobroff ..................... G06F 8/63
717/176
8,555,274 B1 * 10/2013 Chawla ................. G06F 9/5077
718/1
(Continued)

OTHER PUBLICATIONS

Aug. 19, 2015 (WO) International Search Report and Written Opinion—App. No. PCT/US2015/031908.

*Primary Examiner* — Joseph Schell
(74) *Attorney, Agent, or Firm* — Banner & Witcoff, Ltd.

(57) ABSTRACT

Methods, systems, computer-readable media, and apparatuses for providing testing environments using virtualization are presented. In one or more embodiments, a computer system may receive, from a client computing device, a software application. Subsequently, the computer system may receive, from the client computing device, a set of one or more testing parameters for testing the software application. Then, the computer system may create, based on the set of one or more testing parameters for testing the software application, a testing environment for the software application using a native hardware layer that represents hardware on which the software application is configured to be executed. Thereafter, the computer system may initiate a testing session in which software application is executed in the testing environment. Subsequently, the computer system may provide, to the client computing device, a control interface for controlling the testing session.

20 Claims, 23 Drawing Sheets

(52) U.S. Cl.
CPC ...... *G06F 11/3684* (2013.01); *G06F 9/45533* (2013.01); *G06F 11/3672* (2013.01); *G06F 2009/45562* (2013.01); *G06F 2009/45575* (2013.01)

(58) Field of Classification Search
CPC . G06F 2009/45562; G06F 2009/45575; G06F 2009/45587; G06F 9/4443; G06F 9/4445; G06F 9/45533; G06F 9/461
See application file for complete search history.

(56) References Cited

U.S. PATENT DOCUMENTS

| | | | |
|---|---|---|---|
| 8,769,102 B1* | 7/2014 | Zhou | G06F 11/3696 709/223 |
| 9,032,373 B1* | 5/2015 | Gupta | G06F 11/3688 717/127 |
| 9,032,384 B2 | 5/2015 | Blancha et al. | |
| 9,037,689 B2 | 5/2015 | Khandekar et al. | |
| 9,043,480 B2 | 5/2015 | Barton et al. | |
| 9,043,754 B2 | 5/2015 | Fortier et al. | |
| 9,047,410 B2 | 6/2015 | Markande et al. | |
| 2007/0260702 A1* | 11/2007 | Richardson | G06F 17/30861 709/217 |
| 2008/0209275 A1* | 8/2008 | Kwan | G06F 11/3688 714/38.14 |
| 2009/0222814 A1* | 9/2009 | Astrand | G06F 9/45537 718/1 |
| 2009/0300151 A1 | 12/2009 | Friedman et al. | |
| 2013/0167123 A1 | 6/2013 | Dura et al. | |
| 2015/0067045 A1* | 3/2015 | Bharadwaj Shamarao Venkata Rao | H04L 65/4038 709/204 |

* cited by examiner

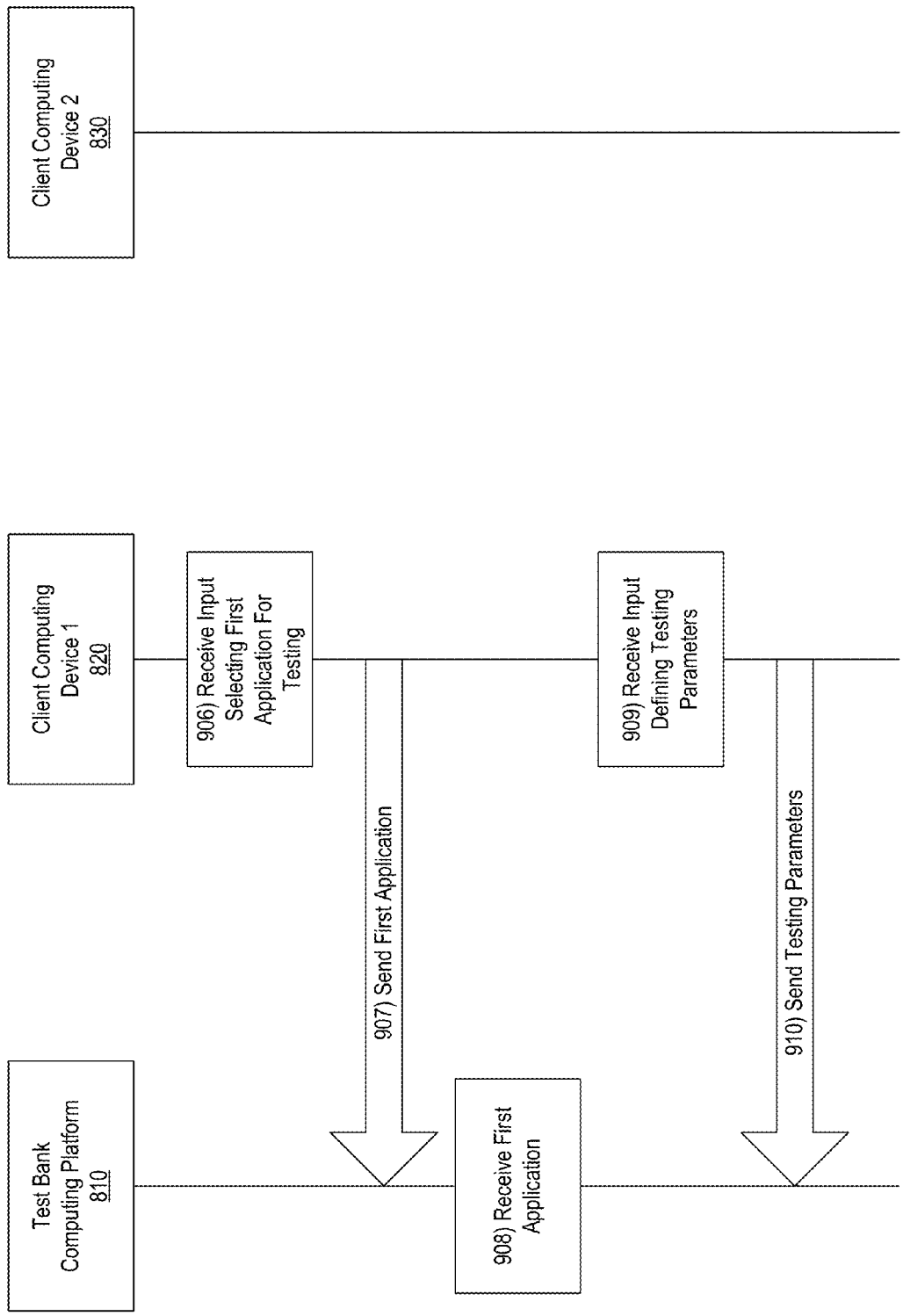

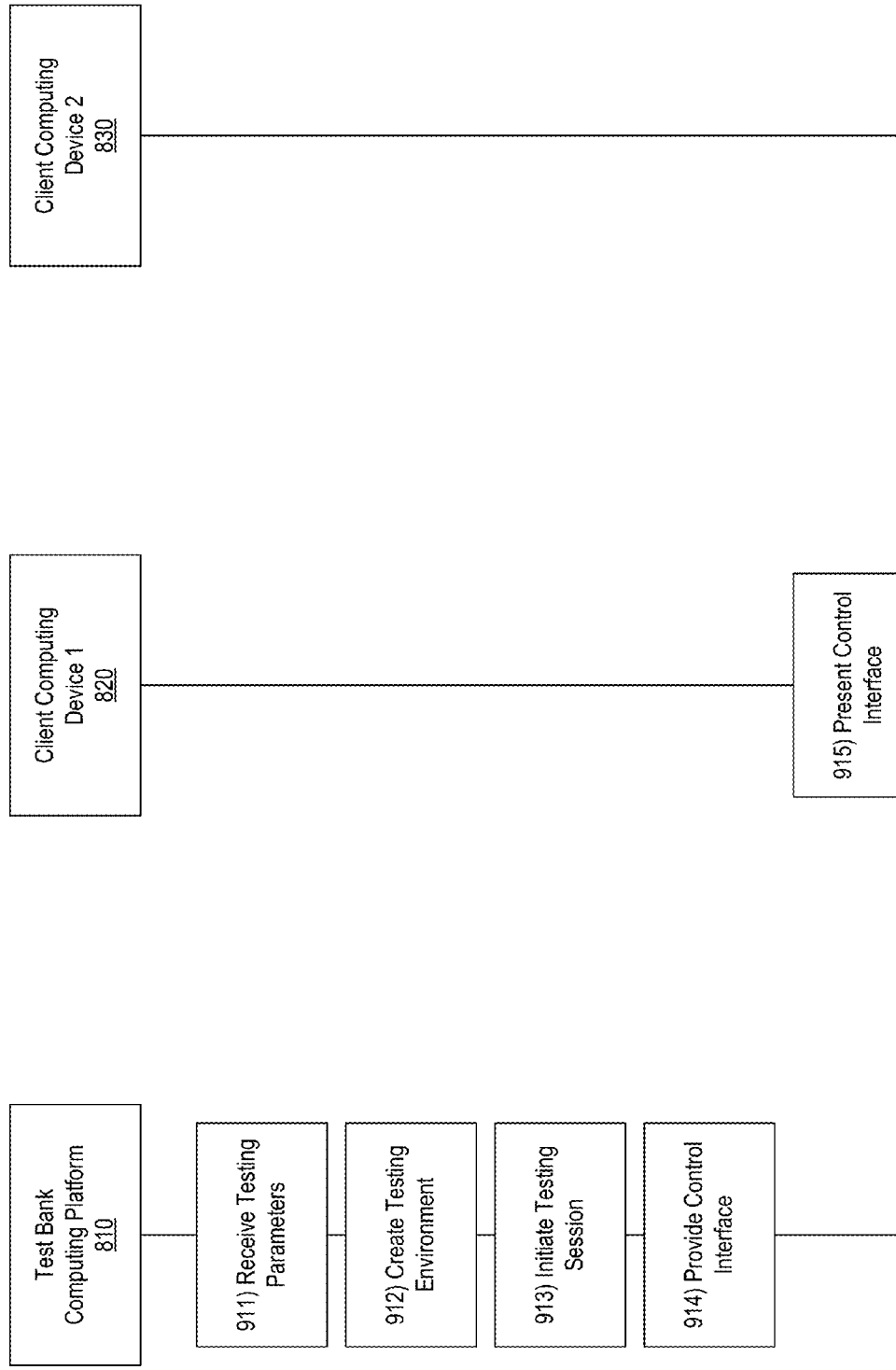

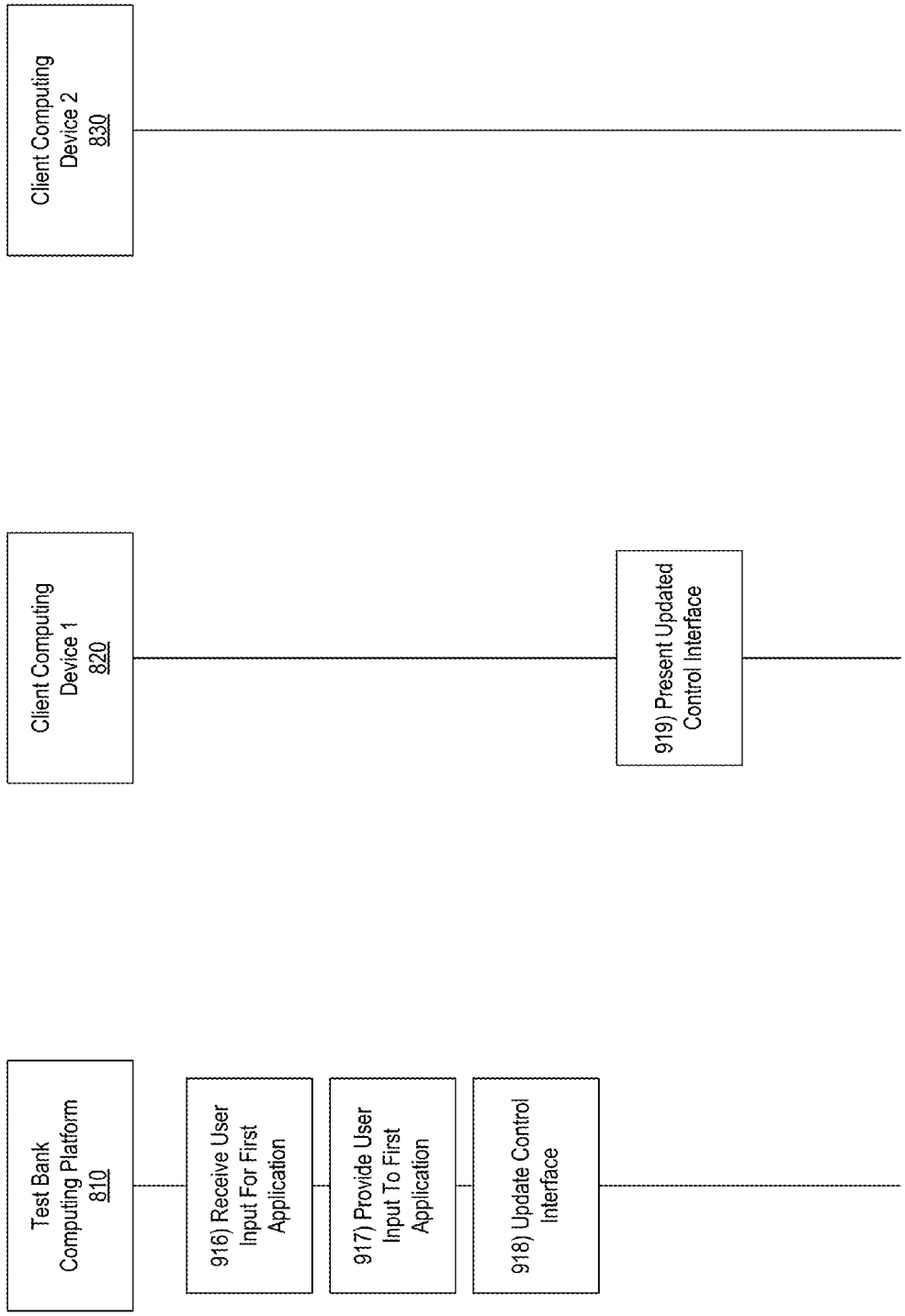

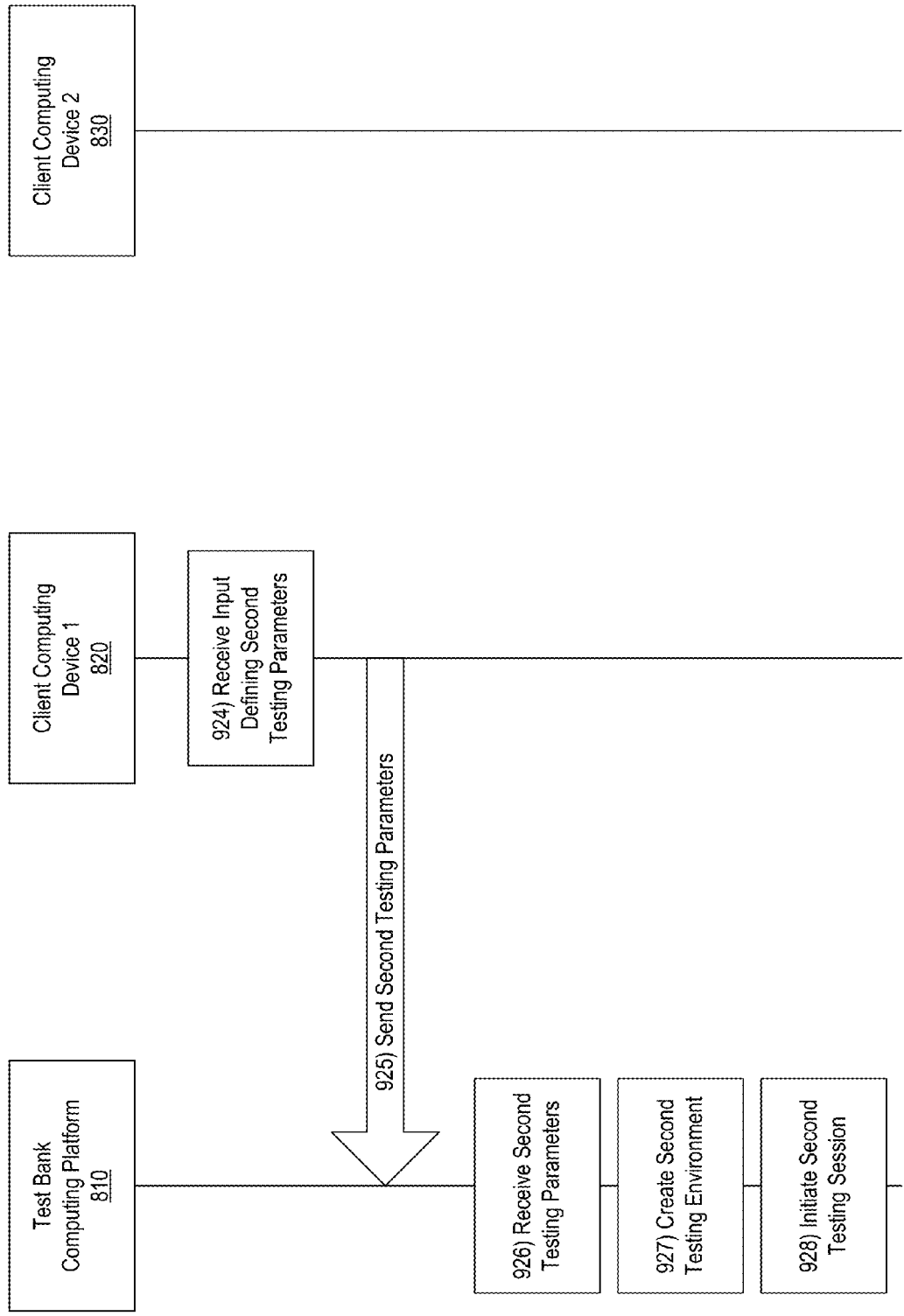

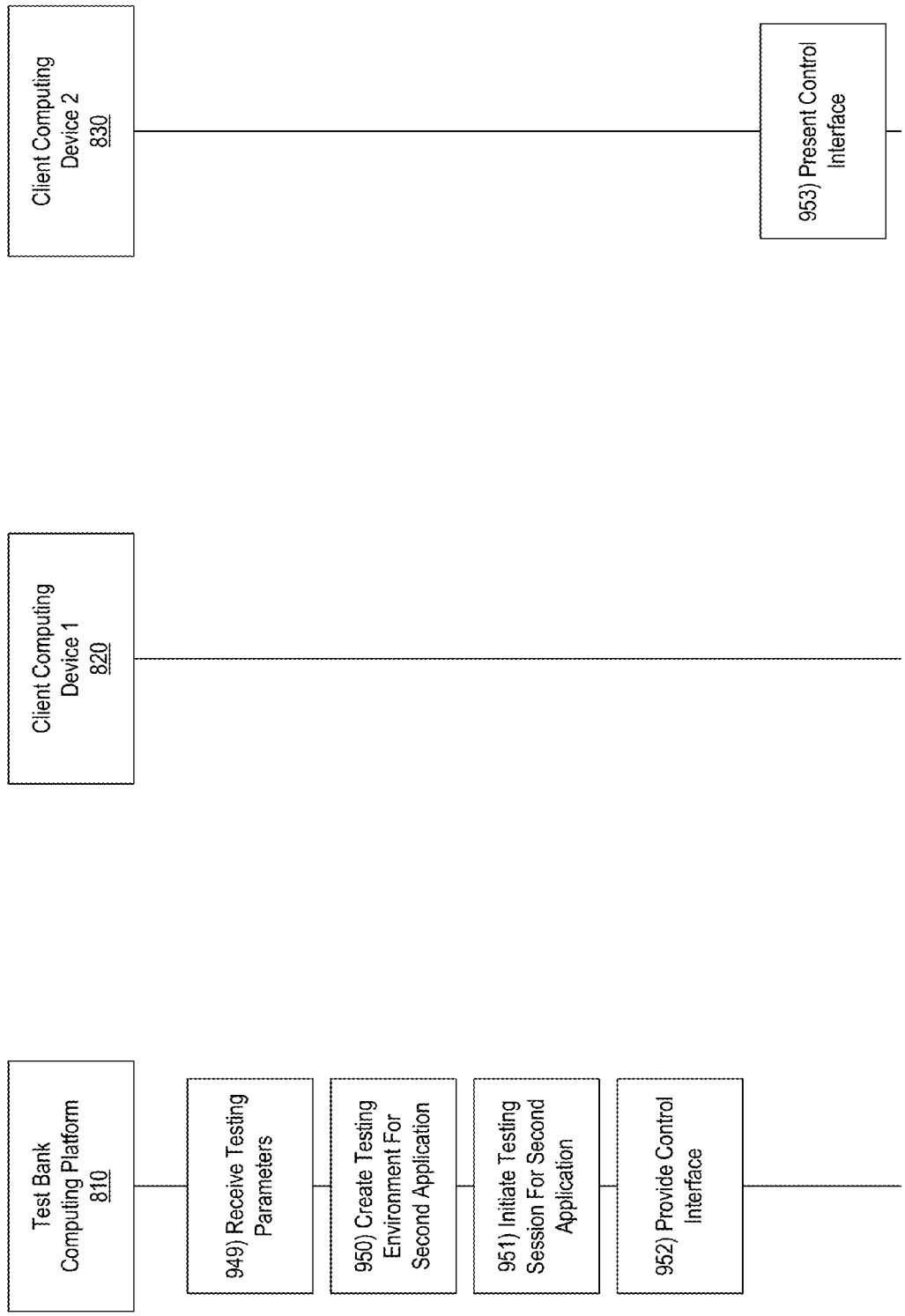

PROVIDING TESTING ENVIRONMENTS FOR SOFTWARE APPLICATIONS USING VIRTUALIZATION AND A NATIVE HARDWARE LAYER

CROSS-REFERENCE TO RELATED APPLICATIONS

This application claims the benefit of and priority to U.S. Provisional Patent Application Ser. No. 62/002,156, filed May 22, 2014, and entitled "Method and System for Virtualization of Multiple Communication Platforms," which is incorporated by reference herein in its entirety.

FIELD

Aspects of the disclosure relate to computer hardware and software. In particular, one or more aspects of the disclosure generally relate to computer hardware and software for providing testing environments using virtualization. For example, some aspects of the disclosure relate to methods and systems for virtualization of different communication platforms, and more particularly for virtualization of different communication platforms to provide testing environments for such platforms.

BACKGROUND

Over the past decade, there has been explosive growth in mobile communications, in both the number and types of available smartphones and applications, or apps, that are installed on such devices. Moreover, these smartphones operate over competing platforms, which are often not compatible. Accordingly, app developers must typically develop different versions of their apps, one for each competing platform. For example, many developers may create an app that is compatible with iOS, the operating system provided by Apple Inc. of Cupertino, Calif., and a separate version of that app designed for Android, the operating system developed by Google Inc. of Mountain View, Calif. Moreover, these operating systems are periodically updated, and app developers must account for the current version of the operating system and some of the older ones. Even more vexing, there are a significant number of communication devices offered by various manufacturers that support these operating systems.

In view of the current development environment, app developers must account for many variables when developing their apps. In addition, once the app is developed, it may be tested on several physical devices. In fact, the app developer may require access to both iOS and Android devices, including those that operate on older versions of the operating systems. This procedure is both inefficient and expensive in view of the numerous operating systems, their versions and the different devices on which they are installed. In an effort to overcome the deficiencies associated with testing many different physical devices, some developers have used emulators that virtualize both the hardware and software of a mobile device. Unfortunately, emulators are significantly slower than the physical devices in view of the interpretations or translations that are involved during their operation. Additionally, simulators, which may replicate the software of a mobile unit but not its hardware, do not provide a realistic alternative to the physical device and are inadequate for development and testing.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards computer hardware and software for providing testing environments using virtualization. In particular, aspects of the disclosure provide efficient, effective, convenient, and scalable ways of providing testing environments for software applications.

For example, as explained above, app developers must consider many different operating systems and architectures when creating their apps. Pre-existing virtual solutions are unsatisfactory because they cannot accurately portray the operating environments of the various platforms or because they are too slow. Moreover, the use of physical devices in app testing sessions is prohibitively expensive and tedious.

One or more aspects of the disclosure provide a method of virtualization and system for supporting same that present a viable solution. In one arrangement, the method can include the steps of providing a native hardware layer that may represent the hardware associated with one or more communication devices and providing a virtual platform that supports different operating environments and that interacts with the native hardware layer to form a virtual test bank. The method can also include the step of providing an interface to enable a user to execute a testing session for an application with respect to at least one of the operating environments of the virtual platform that interacts with the native hardware layer.

Through this arrangement, an app developer may be able to test its app across a wide variety of operating platforms. Moreover, this type of virtualization presents much better performance, in terms of speed and efficiency, over those systems in use today.

For example, in one or more embodiments, a computer system that includes at least one processor, a communication interface, and memory may receive, via the communication interface, and from a first client computing device, a first software application. Subsequently, the computer system may receive, via the communication interface, and from the first client computing device, a first set of one or more testing parameters for testing the first software application. Then, the computer system may create, based on the first set of one or more testing parameters for testing the first software application, a first testing environment for the first software application using a native hardware layer that represents hardware on which the first software application is configured to be executed. Thereafter, the computer system may initiate a first testing session in which the first software application is executed in the first testing environment. Subsequently, the computer system may provide, via the communication interface, and to the first client computing device, a first control interface for controlling the first testing session.

In some embodiments, the first set of one or more testing parameters for testing the first software application may include one or more of an operating system version parameter, a firmware version parameter, a screen size parameter, a screen resolution parameter, or an available virtual hardware parameter.

In some embodiments, creating the first testing environment for the first software application may include initializing a virtual machine based on the first set of one or more testing parameters for testing the first software application.

In some embodiments, the native hardware layer may include one or more processing cores associated with one or more mobile communication devices on which the first software application is configured to be executed.

In some embodiments, the hardware on which the first software application is configured to be executed may be different from hardware associated with the first client computing device.

In some embodiments, the first control interface for controlling the first testing session is provided to the first client computing device via a website.

In some embodiments, the computer system may receive, via the first control interface, and during the first testing session, first user input for the first software application. Subsequently, the computer system may provide the first user input to the first software application in the first testing environment. Thereafter, the computer system may update the first control interface.

In some embodiments, the computer system may receive, via the first control interface, and during the first testing session, first peripheral input for the first software application. Subsequently, the computer system may provide the first peripheral input to the first software application in the first testing environment using one or more emulated peripherals associated with the first testing environment. Thereafter, the computer system may update the first control interface. In some instances, the first peripheral input for the first software application may be received via one or more virtual driver extensions on the first client computing device.

In some embodiments, the computer system may receive, via the communication interface, and from the first client computing device, a second set of one or more testing parameters for testing the first software application. Subsequently, the computer system may create, based on the second set of one or more testing parameters for testing the first software application, a second testing environment for the first software application using the native hardware layer that represents the hardware on which the first software application is configured to be executed. Thereafter, the computer system may initiate a second testing session in which the first software application is executed in the second testing environment. Then, the computer system may provide, via the communication interface, and to the first client computing device, a second control interface for controlling the second testing session.

In some instances, creating the second testing environment for the first software application may include initializing a second virtual machine based on the second set of one or more testing parameters for testing the first software application.

In some embodiments, the computer system may receive, via the communication interface, and from the first client computing device, a request to share the first testing session. Subsequently, the computer system may provide, via the communication interface, and to a second client computing device different from the first client computing device, a second control interface for controlling the first testing session based on the request to share the first testing session.

In some embodiments, the computer system may receive, via the communication interface, and from a second client computing device, a second software application different from the first software application. Subsequently, the computer system may receive, via the communication interface, and from the second client computing device, a second set of one or more testing parameters for testing the second software application. Thereafter, the computer system may create, based on the second set of one or more testing parameters for testing the second software application, a second testing environment for the second software application using a second native hardware layer that represents hardware on which the second software application is configured to be executed. Then, the computer system may initiate a second testing session in which the second software application is executed in the second testing environment. Subsequently, the computer system may provide, via the communication interface, and to the second client computing device, a second control interface for controlling the second testing session.

In some instances, the second set of one or more testing parameters for testing the second software application may include one or more of an operating system version parameter, a firmware version parameter, a screen size parameter, or a screen resolution parameter. In some instances, creating the second testing environment for the second software application may include initializing a second virtual machine based on the second set of one or more testing parameters for testing the second software application. In some instances, the second native hardware layer that represents the hardware on which the second software application is configured to be executed may be different from the native hardware layer that represents the hardware on which the first software application is configured to be executed.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which:

FIGS. 9A-9K depict an example event sequence for providing testing environments using virtualization in accordance with one or more example embodiments.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
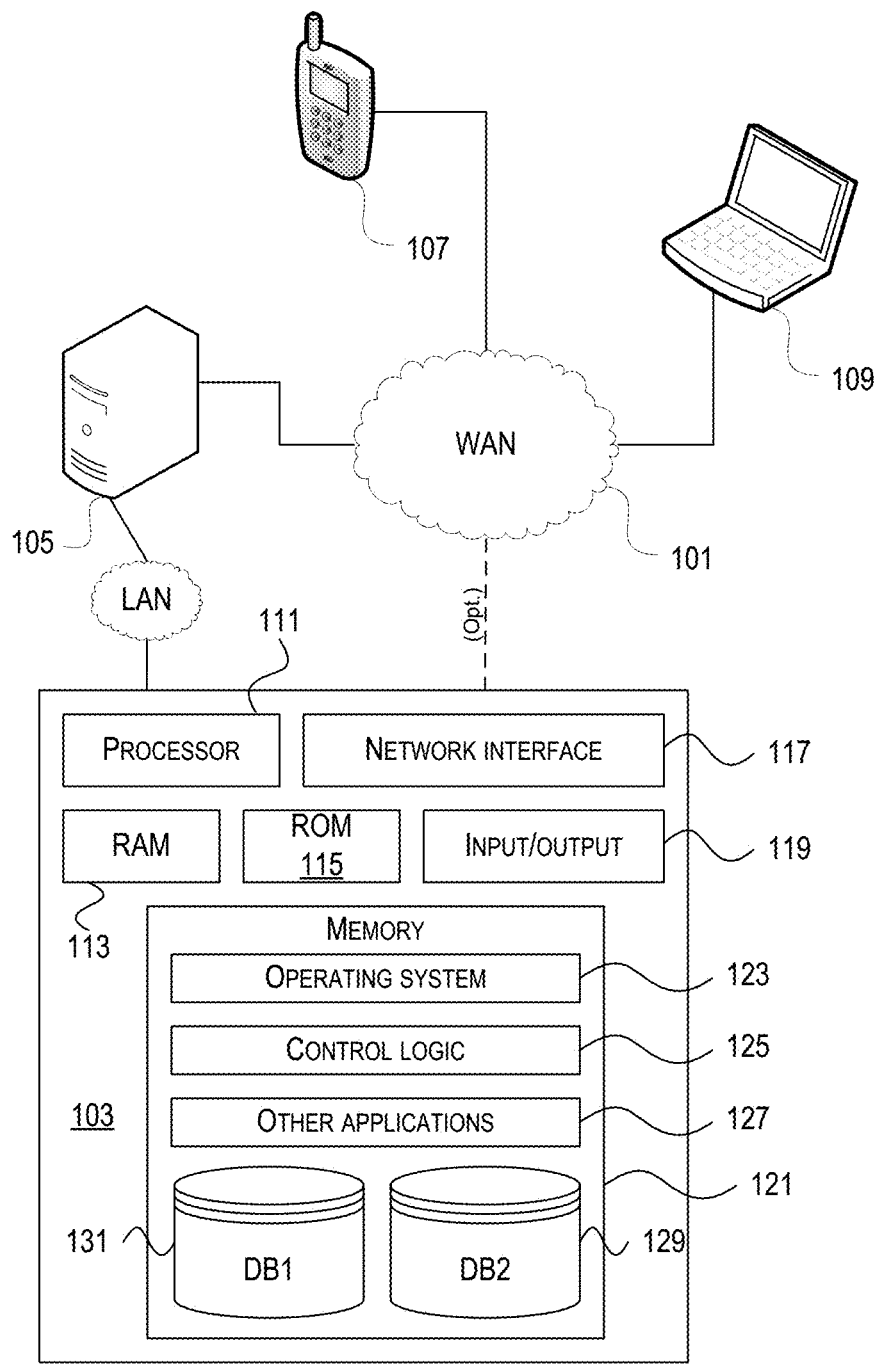
FIG. 1 depicts an illustrative computer system architecture that may be used in accordance with one or more example embodiments.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
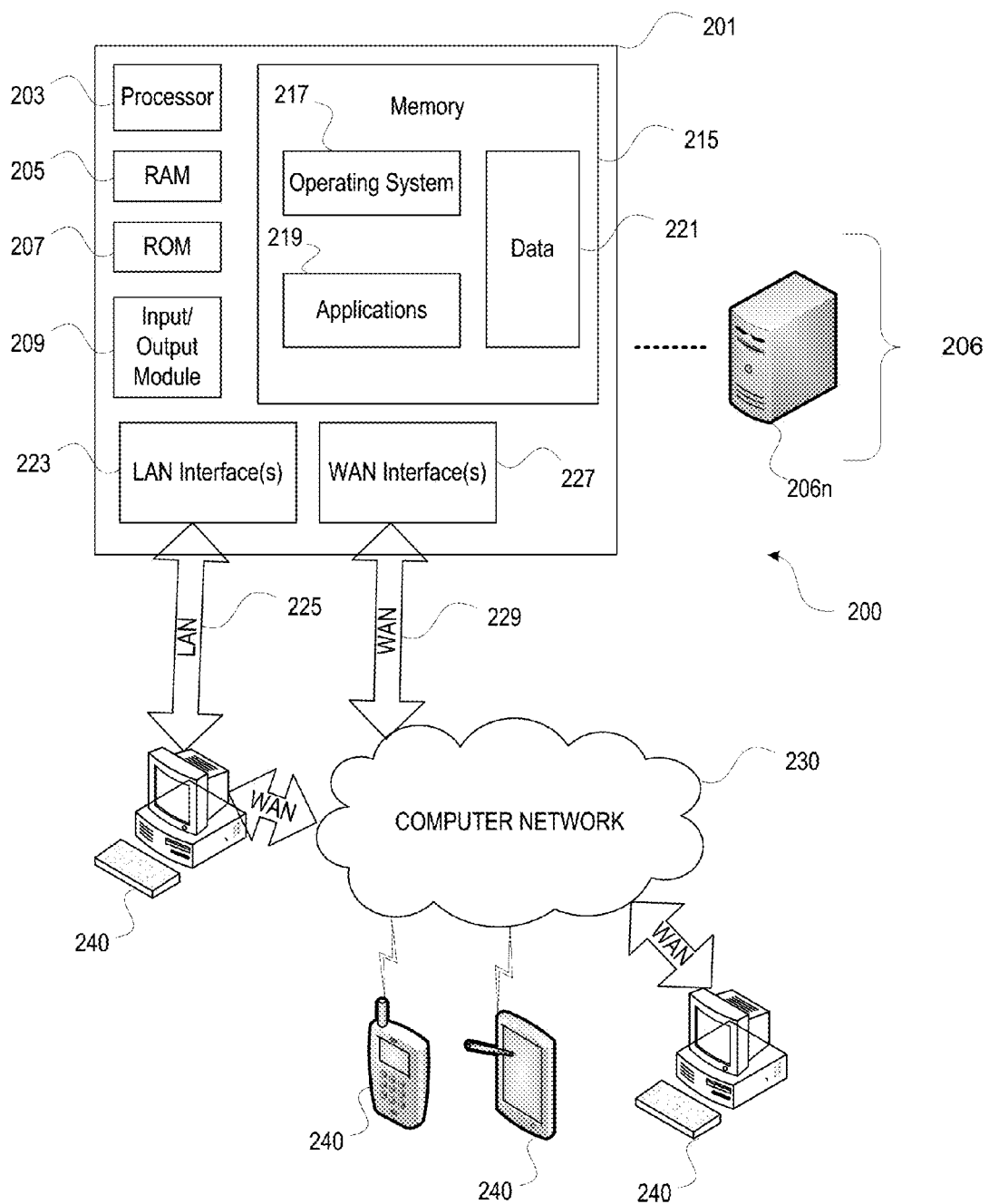
FIG. 2 depicts an illustrative remote-access system architecture that may be used in accordance with one or more example embodiments.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
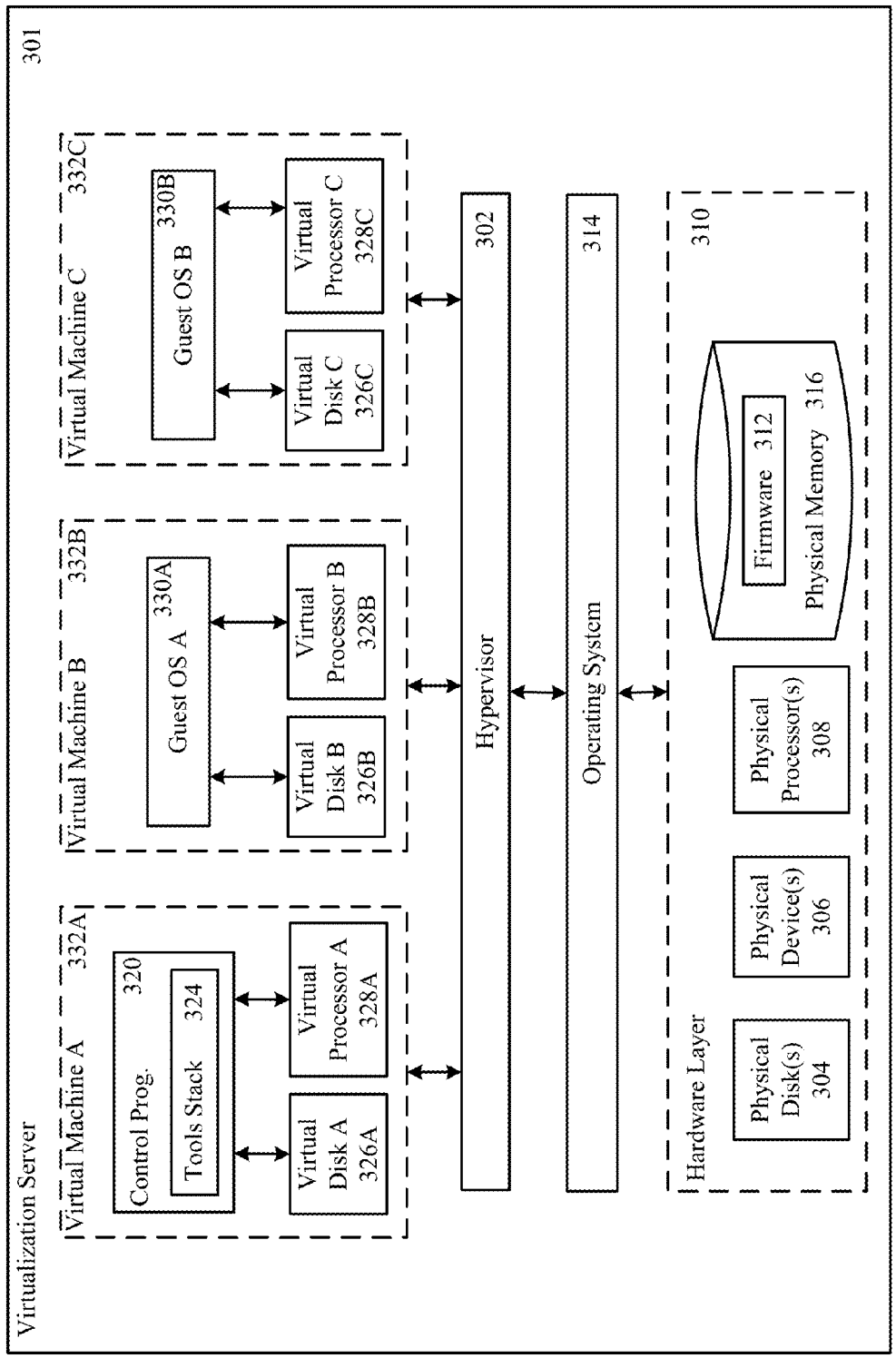
FIG. 3 depicts an illustrative virtualized (hypervisor) system architecture that may be used in accordance with one or more example embodiments.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
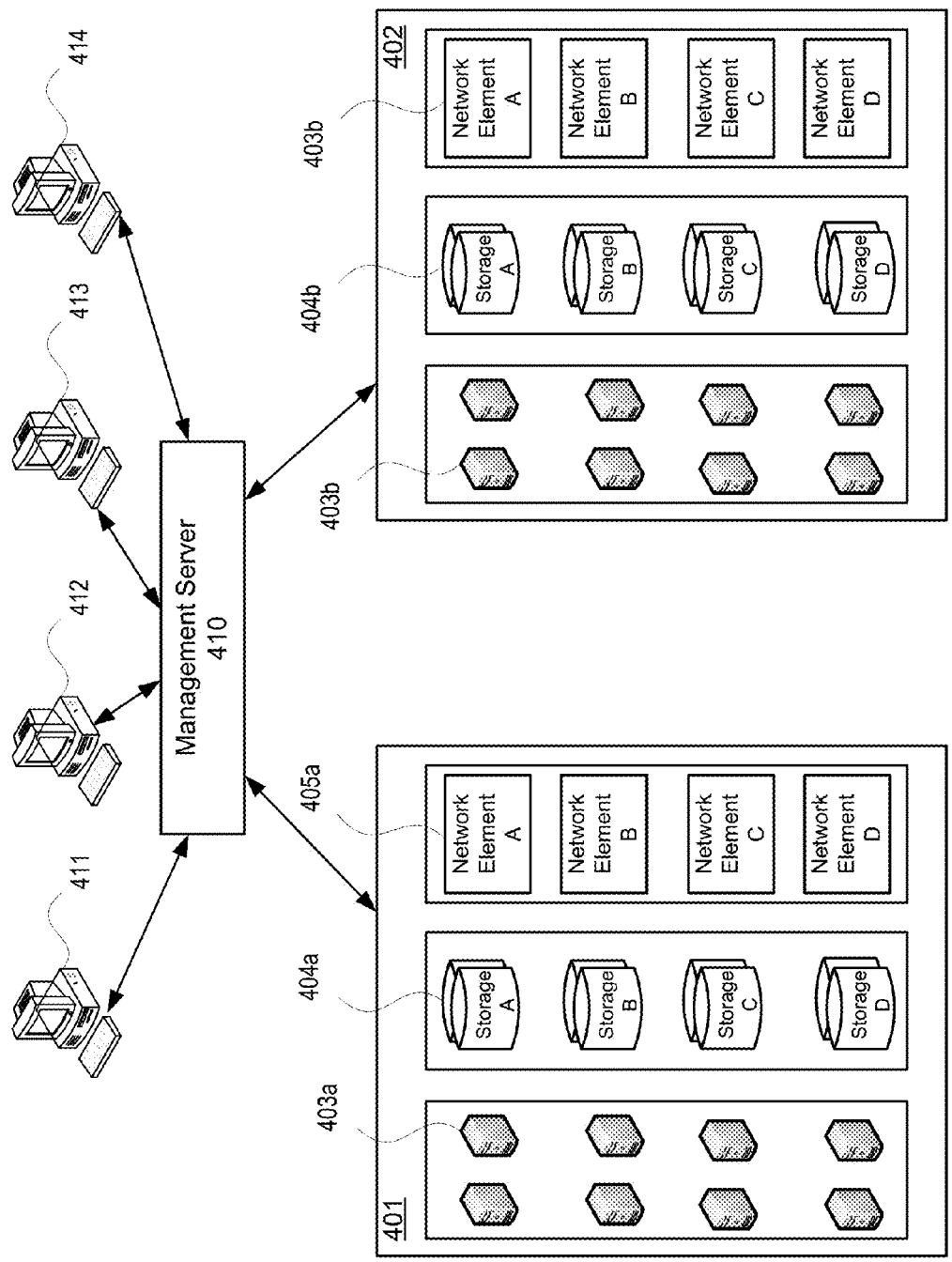
FIG. 4 depicts an illustrative cloud-based system architecture that may be used in accordance with one or more example embodiments.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Providing Testing Environments Using Virtualization

As illustrated in greater detail below, a method of virtualization is presented herein. In one embodiment, the method can include the steps of providing a native hardware layer that represents the hardware associated with one or more communication devices and providing a virtual platform that supports different operating environments and that interacts with the native hardware layer to form a virtual test bank. The method can also include the step of providing an interface to enable a user to execute a testing session for an application with respect to at least one of the operating environments of the virtual platform that interacts with the native hardware layer.

The different operating environments may include different virtual operating systems or different versions of those virtual operating systems. In addition, the different operating environments may further include one or more emulated peripherals. As an example, some of the emulated peripherals may be common to at least two or more of the different virtual operating systems, and some of the emulated peripherals may be unique to at least one of the virtual operating systems.

The method can further include the step of providing a client interface for transmission to an end-user machine that enables the installation of virtual driver extensions on the end-user machine to permit a user to interact with the emulated peripherals. In addition, providing an interface may include providing an interface to enable the user to execute the testing session for the application with respect to the virtual platform such that the testing session runs across the different operating systems or the different versions of the operating systems. As another example, providing the interface may include providing a web site that a user may access through a computer that is remote to the virtual test bank or enabling a headless mode that allows for access to the virtual test bank and that bypasses the web site.

In one arrangement, the web site can includes a snapshot feature that permits the user to save a snapshot of the testing session for later re-launch of the testing session. The web site may also include a recording feature that permits the user to record the testing session and a sharing feature. The sharing feature can permit the user to share a snapshot of the testing session, a recording of the testing session or a live transmission of the testing session.

A virtual test bank is also described herein. The virtual test bank may include an interface that can be configured to receive communications signals from one or more end-user machines and a plurality of processing units that form a native hardware layer. The processing units are configured to support a virtual platform that presents different operating environments such that the virtual test bank enables the testing of applications with respect to one or more of the different operating environments. The different operating environments may include different virtual operating systems or different versions of those virtual operating systems such that the virtual test bank enables simultaneous testing of an application with respect to a plurality of different virtual operating environments. The virtual platform can be further configured to present a hypervisor that supports one or more emulated peripherals and the emulated peripherals are part of the different operating environments.

A method of testing an application over a plurality of different operating environments is also described herein. At an end-user machine, a virtual client that includes one or more virtual driver extensions can be launched. A virtual test bank that supports multiple different virtual operating environments that interact with a native hardware layer can be accessed through the end-user machine. In addition, a testing session for an application with respect to the multiple different virtual operating environments can be initiated on the end-user machine. In one embodiment, initiating the testing session for the application can include initiating the testing session for the application with respect to the multiple different virtual operating environments in a simultaneous manner.

In another embodiment of this method, the different virtual operating environments may include one or more emulated peripherals and one or more of the emulated peripherals may be accessed at the virtual text bank through the virtual driver extensions. The method may also include one or more of the following: capturing a snapshot of the testing session for later re-launch of the testing session; recording at least a portion of the testing session; or sharing the snapshot of the testing session, the recorded portion of the testing session or a live transmission of the testing session.

A machine for testing applications is also described herein. The machine can include a display unit that can be configured to display a portal that enables a user to a access a remote virtual test bank and can include a processing unit. The processing unit can be configured to cause a connection to be established with the virtual test bank in which the virtual test bank can support multiple different virtual operating environments. The processing unit can also be configured to establish a testing session over the connection for an application installed on or accessible to the machine such that the user tests the application over the multiple different virtual operating environments.

The machine can further include an interface that may be configured to receive a virtual client that includes one or more virtual client extensions, and the different virtual operating environments support one or more emulated peripherals. Moreover, the processing unit may be further configured to enable the user to access the emulated peripherals through the virtual client extensions. In another embodiment, the processing unit can be further configured to cause a snapshot of the testing session to be captured; cause at least a portion of the testing session to be recorded; or cause the snapshot, the recorded portion or a live transmission of the testing session to be shared.

As explained above, app developers must consider many different operating systems and architectures when creating their apps. Pre-existing virtual solutions are unsatisfactory because they cannot accurately portray the operating environments of the various platforms or because they are too slow. Moreover, the use of physical devices in app testing sessions is prohibitively expensive and tedious.

A method of virtualization and system for supporting same that present a viable solution are described herein. In one arrangement, the method can include the steps of providing a native hardware layer that may represent the hardware associated with one or more communication devices and providing a virtual platform that supports different operating environments and that interacts with the native hardware layer to form a virtual test bank. The method can also include the step of providing an interface to enable a user to execute a testing session for an application with respect to at least one of the operating environments of the virtual platform that interacts with the native hardware layer.

Through this arrangement, an app developer may be able to test its app across a wide variety of operating platforms. Moreover, this type of virtualization presents much better performance, in terms of speed and efficiency, over those systems in use today.

Figure 5:
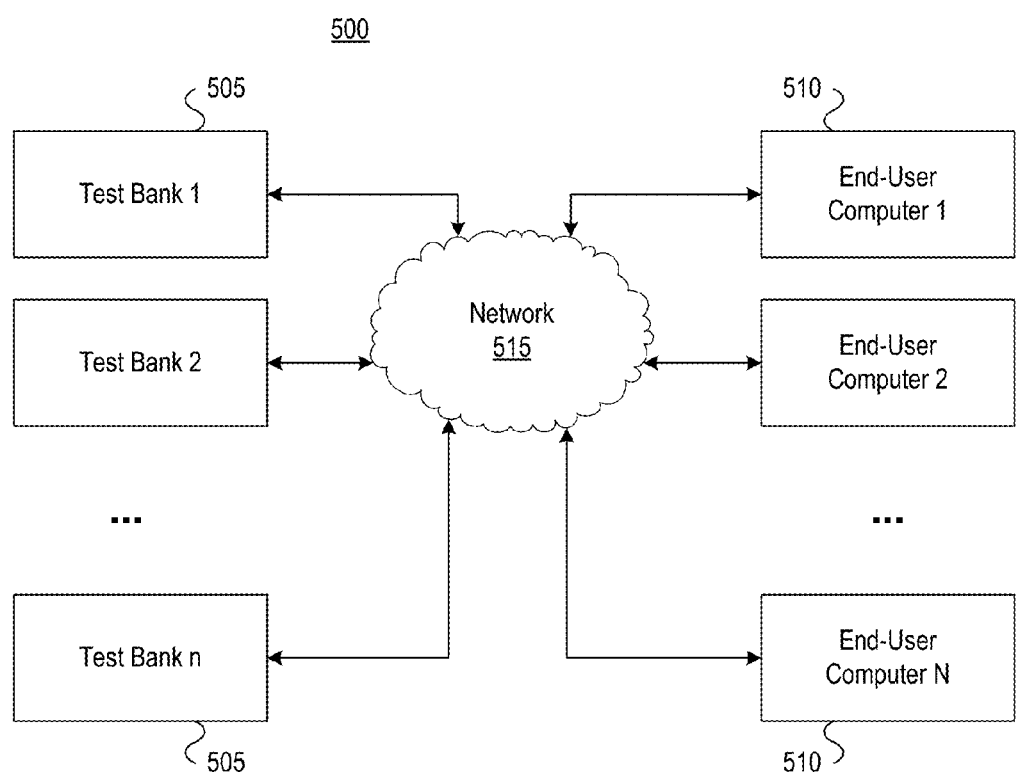
FIG. 5 depicts an example system for testing applications that may be used in accordance with one or more example embodiments.

Referring to FIG. 5, a system 500 for testing applications is shown. In one arrangement, the system can have one or more virtual test banks 505 and one or more end-user computers 510. The test banks 505 can be communicatively coupled to the end-user computers 510 through one or more networks 515, which can be any suitable combination of wired or wireless networks, including both wide-area and local networks. The end-user computers 510 can be any machine that is configured to enable a user to test one or more applications on the test banks 505, including both mobile and non-mobile devices. In particular, a test bank 505 can present several different operating environments through which the user may determine the compatibility of the application being tested. As will be explained later, the test bank 505 can present in virtual form multiple operating systems and versions of those systems for testing. The test bank 505 can also provide a native hardware layer that can improve the efficiency of the testing process.

Figure 6:
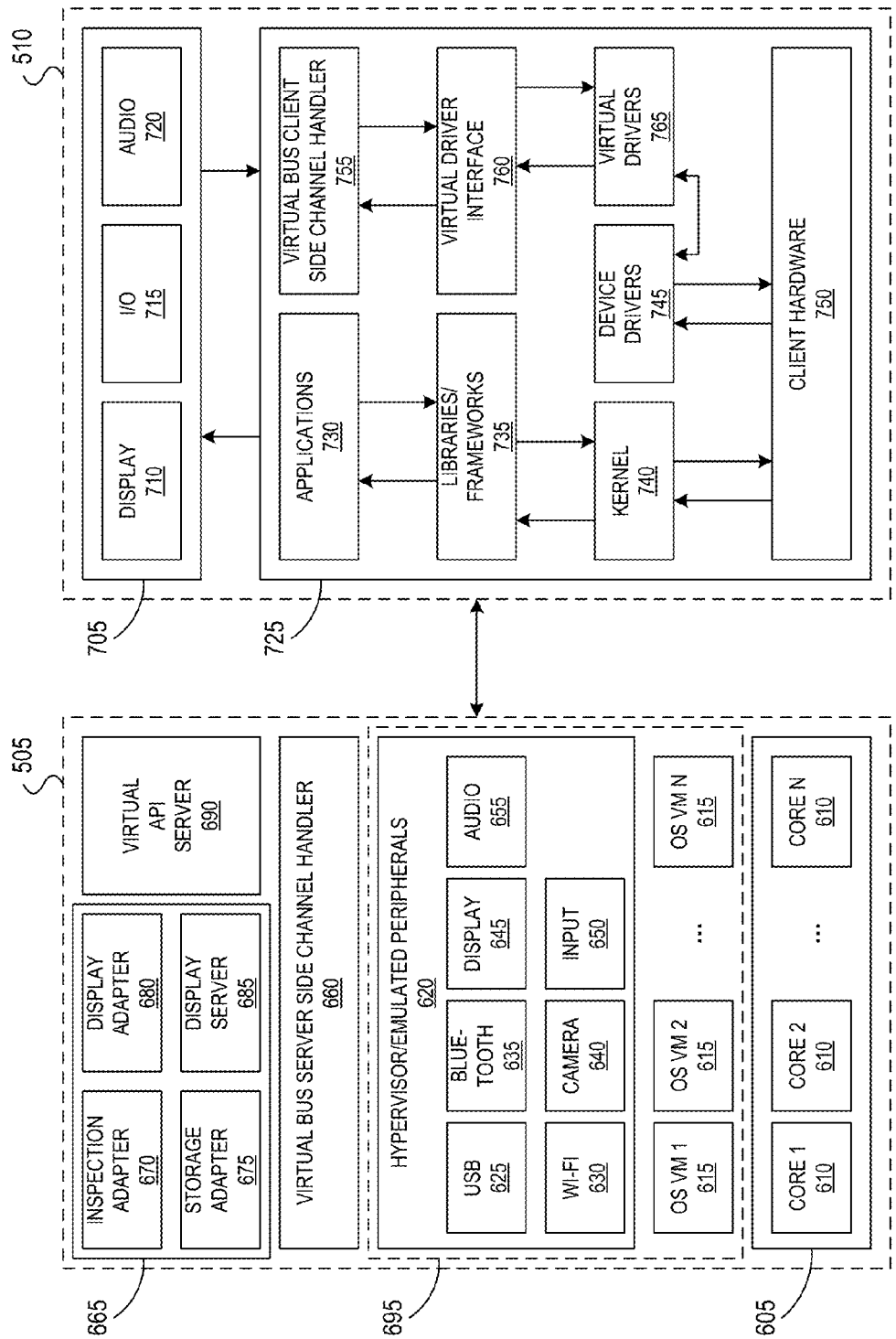
FIG. 6 depicts an example of a virtual test bank and an end-user computer that may be used in accordance with one or more example embodiments.

Referring to FIG. 6, examples of a virtual test bank 505 and an end-user computer 510, both in block diagram form, are illustrated. As mentioned earlier, the test bank 505 can support different operating environments against which a user may assess one or more applications to determine the compatibility or operational performance of that application with respect to the different operating environments. In one arrangement, the test bank 505 can include a hardware layer 605, which can contain one or more processing units or cores 610. As an example, the hardware layer 605 can be a native hardware layer in that the cores 610 execute instruction sets that are native to the type of environments in which the applications being tested operate. As a specific but non-limiting example, the applications being tested may be mobile applications that operate on ARM processing units, and the cores 610 of the hardware layer 605 may be ARM cores. Because of this uniformity, no translation is needed at the hardware layer 605, which can significantly improve performance. Although described in terms of the ARM architecture, other architectures are certainly within the scope of this description.

A virtual platform 695 may sit over and interact with the hardware layer 605. The virtual platform 695 may include one or more virtual operating systems 615 and one or more hypervisors 620. As an example, the virtual operating systems 615 may represent different operating systems that are commonly used with devices that support the applications being tested. In addition, the virtual operating systems 615 may represent different versions of these operating systems, such as current and older versions of an operating system. For example, one of the virtual operating systems 615 may represent a current version of iOS, the mobile operating system created and distributed by Apple. As another example, another of the virtual operating systems 615 may represent an older version of iOS that may still be in use by many mobile devices. Also, other virtual operating systems 615 may be virtualized instances of current and older versions of Android, the mobile operating system developed by Google. This particular arrangement is useful because a wide variety of operating systems and the different versions thereof may be accessible by a developer for application testing.

In one arrangement, the hypervisor 620 may contain the code for any number of emulated peripherals. These peripherals may be particular to certain models of devices on which the applications to be tested may be installed and executed. In this sense, some of the emulated peripherals may be unique to a particular virtual operating system 615 or a version thereof in that the emulated peripheral may be specifically designed for and compatible with that operating system 615 or that version thereof. In another arrangement, one or more of the emulated peripherals may be common to two or more of the different operating systems, including the different versions of those operating systems.

There are several examples of emulated peripherals that may be part of the hypervisor 620. Without limitation, some of these examples include a USB peripheral 625, a Wi-Fi peripheral 630, a Bluetooth peripheral 635, a camera peripheral 640 (video or still or both), a display peripheral 645, an input peripheral 650 (such as a mouse or keyboard/keypad) or an audio peripheral 655 (such as speakers or microphones). Although not shown here, other components or features that are commonly built into devices that interact with applications may also be emulated, such as accelerometers, vibration units, etc.

In view of this arrangement, a virtual operating system 615 or a particular version of an operating system 615 and any combination of the emulated peripherals may form an operating environment against which an application may be tested. Moreover, the virtual test bank 505 can present multiple different operating environments in view of the various instances of the operating systems 615 (and the different versions thereof) and the assortment of available emulated peripherals. Accordingly, an application developer could easily access virtual instances of almost any commercially-available operating environment from a single point for purposes of testing any number of applications. As noted earlier, however, the use of the native hardware layer 605 ensures optimal performance of such a testing process.

The virtual test bank 505 may also include a virtual bus server side channel handler 660, an adaption unit 665 and a virtual API server 690. The bus server side channel handler 660 may be responsible for transporting the relevant emulated peripherals of the hypervisor 620. Further, the adaption unit 665 may be configured to normalize or compress or otherwise process the communications associated with the emulated peripherals and may pass such communications to the channel handler 660. In another arrangement, the adaption unit 665 may be omitted, and the emulated peripherals may be directly connected to the channel handler 660. As an example, the adaption unit 665 may include a packet inspection adapter 670, a NAND/Flash storage adapter 675, a display adapter 680 and a display server 685, although other components may be part of the adaption unit 665. In addition, the adaption unit 665 is not required to contain each of the aforementioned components. As an example, the display adapter 680 may optimize the display communications by providing differentials of the pixel changes instead of a complete copy of the current display buffer. As another example, the packer inspection adapter 670 can permit the inspection and recording of packets to and from the virtual test bank 505. The API server 690 can provide an interface for receiving communication signals from and transmitting signals to any number of end-user computers 510.

In view of the design of the test bank 505, it is easily scalable and/or adjustable. For example, if a manufacturer or some other entity discontinues its support for a particular operating system version, that version may be easily removed from the test bank 505. Conversely, if a new version of an operating system is released, the new version may be added to the test bank. Moreover, any modifications to real-world peripheral implementations may also be to the emulated peripherals on a corresponding basis. Simply put, the virtual test bank 505 can be modified in accordance with any changes that may occur in the associated physical operating environments with minimal expense.

Turning to the end-user computer 510, in some embodiments, a client interface 725 may be part of the computer 510. For example, the virtual test bank 505 or some other unit may transmit the client interface 725 to the end-user computer 510, and the client interface 725 may provide virtual driver extensions for use with the virtual test bank 505. When installed, the client interface 725 may be integrated with the pre-existing architecture of the end-user computer 510. For example, the end-user computer 510 may include an applications layer 730, a libraries/frameworks layer 735, a kernel 740, any number of device drivers 745 and a hardware layer 750. The hardware layer 750 can include any number of processing units to enable the end-user computer 510 to establish a connection with the virtual test bank 505 and to establish any number of testing sessions with the test bank 505 for the application to be tested. The hardware layer 750 can also include various UI components to enable the user to experience the testing session of the application. For example, the hardware layer 750 can include one or more display units, audio units and input/output units to perform such a task.

When installed, the client interface 725 can provide a way to replicate the peripheral inputs and outputs of the test bank 505 through the components or features of the end-user computer 510. As an example, a virtual bus client side channel handler 755, a virtual driver interface 760 and any suitable number and type of virtual device drivers 765 may be integrated with the architecture of the end-user computer 510. In one embodiment, the number and type of virtual device drivers 765 that are installed on the computer 510 may correspond to the number and type of emulated peripherals offered by the test bank 505, although such a correspondence is not mandatory.

To assist in the testing of an application from the end-user computer 510, an interface can be generated that can enable a user to interact with the virtual test bank 505. As an example, the interface can be a web site that is remote to the end-user computer 510 and that can provide multiple features related to application testing. In short, the web site can serve as an implementation of the test bank 505 and testing portal for the end-user computer 510 to allow the user to experience the testing of the applications. In this case, a representation 705 of the web site is shown, including a display element 710, an input/output element 715 and an audio element 720. The display element 710 and the audio element 720 can enable the user to (respectively) see and hear how a tested application may interact with the different operating environments supported by the test bank 505. Moreover, the input/output element 720 can permit a user to make selections or to receive information associated with the testing of the application. Other features offered by the web site will be presented below.

Although a user may access the services provided by the test bank 505 through a web site, such a configuration is not an absolute necessity. For example, the system 500 offers a headless mode in which a direct connection may be made to the virtual API server 690 of the test bank 505 without the use of a web site or other portal.

In one embodiment, the applications that are to be tested against the different operating environments offered by the test bank 505 may be part of the applications layer 730, meaning that they may be installed on the end-user computer 510. In some cases, however, an application to be tested may be installed on another device that may be remote to the computer 510, and a virtual instance of the application can be used for the testing session. Examples of testing sessions and some of the features available during such sessions will be presented below.

The arrangement described here also enables a user to use development and debugging tools that a manufacturer or some other supportive entity may provide the application development. For example, for a particular operating environment (operating system 615 and accompanying emulated peripherals), a user testing an application through the test bank 505 may rely on pre-existing tools for doing so, tools that may normally be used when testing in a comparable physical environment. As a more specific but non-limiting example, the user may employ Xcode, a set of tools for developing software for iOS, to conduct the testing of the application. Other native development tools may be employed in view of the various operating environments supported by the test bank 505.

Figure 7:
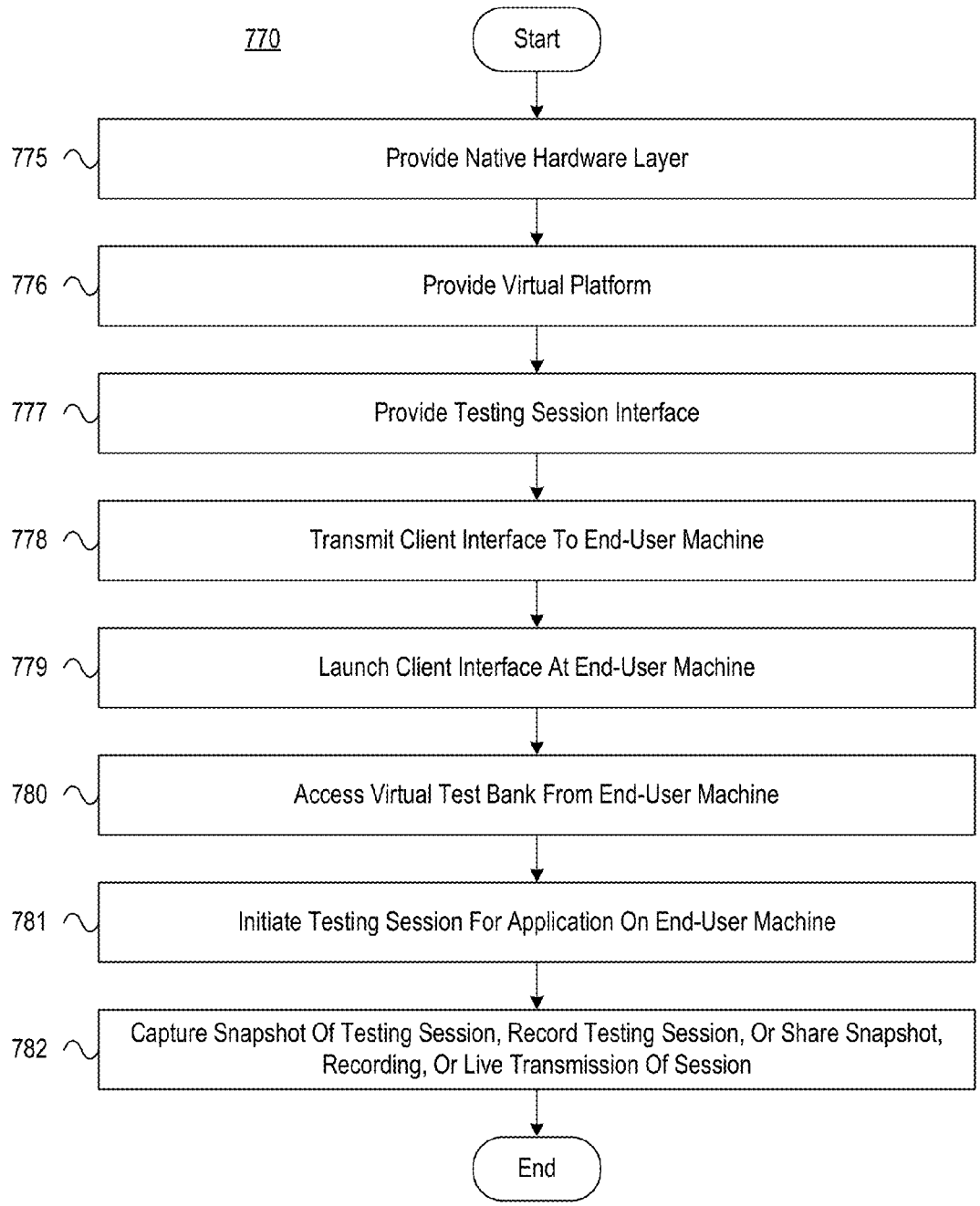
FIG. 7 depicts an example of a method for testing an application over a plurality of different operating environments in accordance with one or more example embodiments.

Referring to FIG. 7, an exemplary method 770 for testing an application is shown. The method 770, however, may include additional or even fewer steps or processes in comparison to what is illustrated in FIG. 7. Moreover, the method 770 is not necessarily limited to the chronological order that is shown in FIG. 7. In describing the method 770, reference may be made to FIGS. 5 and 6, although it is understood that the method 770 may be practiced with any other suitable systems and components and may take advantage of other suitable processes.

At step 775, a native hardware layer may be provided, and a virtual platform may be provided, as shown at step 776. At step 777, a testing session interface may be provided, and at step 778, a client interface may be transmitted to an end-user machine. The client interface can be launched at the end-user machine, as shown at step 779, and at step 780, a virtual test bank can be accessed from the end-user machine. At step 781, a testing session for an application on the end-user machine can be initiated. At step 782, a snapshot of the testing session can be captured or a portion of the testing session can be recorded. As also shown in step 782, the snapshot, the recorded portion or a live transmission of the testing session can be shared.

For example, an entity may offer testing services through any number of virtual test banks 505 that may include a native hardware layer 605 and a virtual platform 695 that supports the different operating environments and interacts with the hardware layer 605, as described above. The entity may also offer a testing session interface for an application with respect to one or more of the different operating environments. As noted earlier, the testing session interface may be implemented in a web site that the user can access.

To test one or more applications, the user may sign up with a service and in response, the offering entity may transmit the client interface 725 to the end-user computer 510 or some other appropriate device. The user can then launch the client interface 725, which can cause the installation of the virtual driver extensions, as illustrated above. As an example, the user may then access the virtual test bank 505 from the end-user computer 510, such as through the web site. At this point, the user may initiate a testing session for one or more applications, such as one or more applications installed on the end-user computer 510.

For example, a user may select which particular operating environment that is offered by the test bank 505 to use for purposes of testing the application. In one embodiment, the application may be simultaneously tested against multiple operating environments supported by the test bank 505. In fact, multiple applications may be simultaneously tested against multiple operating environments, if so desired. For example, an application developer may wish to test an iOS application against numerous different versions of the virtual iOS operating system 615 and its associated emulated peripherals at the same time. In another arrangement, the testing of one or more applications against multiple operating environments may be performed in a serial fashion. In this case, as soon as a testing session is completed for one particular operating environment, another session may be initiated for another operating environment. Also, a testing session can be paused or canceled at any time with respect to a first operating environment, and the tested application can be switched to a second operating environment to start another testing session.

During or following the testing session, the user can track the performance of the application that is being tested. If the application is being tested against multiple operating environments, the user may move between such sessions to monitor the performance of each session. Additionally, the end-user computer 510 may enable the user to use various development and debugging tools that are provided for the applications by relevant manufacturers, as noted earlier. A user may also be able to connect to cloud-sharing accounts and upload data related to the application being tested or, as will be explained later, the testing sessions themselves. In fact, a user who is testing applications through the test bank 505 may take advantage of virtually any service in the marketplace that is available to assist application developers in creating applications.

There are several other features that may be provided to a user to assist in the testing sessions. For example, the web site (or other component) may be equipped with a snapshot feature. When activated, the snapshot feature can capture a snapshot of one or more testing sessions. The data that is captured may be any information that is associated with the testing of the application with respect to the operating environments. This data can be saved and can be retrieved at a later time, if so desired. That way, if there is an issue with the testing session, the user may fetch the snapshot and return the testing session to an earlier state. The snapshot feature may be activated at any suitable time, including automatically in accordance with a predetermined schedule or randomly.

As another example, the web site (or other component) may include a recording feature, which can be used to record one or more testing sessions with respect to an application being tested. In particular, a video recording of such testing sessions may be conducted by the user, which can allow the user to determine what factors may have led to a crash or what parameters need to be in place to detect a specific user-interface bug. This process may also be used to create videos of mobile software in use, including how-to instructions and demonstrations of new features.

A sharing feature may also be provided to the user for use in connection with testing sessions. For example, a snapshot or recording of a testing session may be shared with other application developers, technical experts or other suitable individuals in an effort to solve an issue or receive feedback with respect to the testing or development of the application. In the case of sharing a snapshot, a link may be sent to another user, such as through email or some other messaging service, and this other user may launch the session from that saved state. A similar process may be carried out for sharing a recording session, and the saved session may be viewed in any type of media player.

The sharing feature may also enable a user to share live testing sessions with other users to allow the other users to, for example, track the sessions from a remote location. User-interface elements may also be generated to enable the other users to provide feedback concerning the shared live sessions. In fact, these other users may be invited to control one or more aspects of the testing sessions, including through interaction with the virtual test bank 505.

In summary, a user may have many options with respect to testing sessions for the applications. In particular, a user can launch one or more testing sessions for an application—simultaneously or in a serial manner—for one or more operating environments supported by the test bank 505. The user can capture and share data with any of these sessions and can retrieve such data at a later time. Moreover, in view of the arrangement of the virtual test bank 505, the efficiency and performance of this system is much improved over those in existence today.

As previously noted, the virtual test bank 505 may include any number of emulated peripherals. Further explanation of the operation and interaction of these peripherals will now be presented. The virtual driver extensions that are part of the end-user computer 510 allow for a user to plug-and-play with the different emulated peripherals of the test bank 505. For example, the USB peripheral 625, which can emulate a physical USB stack, can enable the user to test any feature of the application that requires a USB connection. The virtual driver extensions of the end-user computer 510 can "trick" the end-user computer 510 into thinking that it is engaged with a physical USB stack. In particular, the USB peripheral 625, in combination with the virtual driver extensions, can encapsulate USB packets with IP packets for delivery to the test bank 505 and the end-user computer 510.

A similar process may be carried out for Wi-Fi related testing. In some cases, the end-user computer 510 may require that it conduct all wireless transmissions with a local Wi-Fi connection, which may conflict with the test bank 505 being remotely located. That is, the application to be tested may not operate properly unless it is connected to a local network. To enable the use of the Wi-Fi peripheral 630, a virtual private network (VPN) may be established between the test bank 505 and the end-user computer 510. The IP packets that would normally be sent to the conventional Wi-Fi driver on the end-user computer may be intercepted, encapsulated, compressed and then sent to the test bank 505 to enable the interaction with the Wi-Fi peripheral 630.

Additionally, the encapsulated packets that are delivered to the end-user computer 510 may be decapsulated and injected into the Wi-Fi stack on the end-user computer 510 for conventional processing, making it appear that the connection is with the local network.

There are other examples of how the emulated peripherals may be used during a testing session. For example, a connection can be established with the Bluetooth peripheral 635 of the test bank 505, which can allow the Bluetooth peripheral 635 to interact with physical Bluetooth devices that may be coupled to the end-user computer 510. That is, a bridge between the emulated Bluetooth peripheral 635 and a physical Bluetooth component may be established through the end-user computer 510.

As another example, a user may interact with the camera peripheral 640 of the test bank 505 by streaming video or otherwise sending images to the camera peripheral 640 via one or more cameras of the end-user computer 510. Similarly, a user may pass audio signals between the conventional audio components of the end-user computer 510 and the audio peripheral 655 of the test bank 505 for purposes of testing audio features associated with an application. A user may also be allowed to switch between the display unit of the end-user computer 510 and the emulated display peripheral 645 to test the visual aspects of the application. Although several examples of emulated peripherals and possible uses for same have been presented here, such description is not meant to be exhaustive. Those skilled in the art will appreciate that other emulated peripherals may be part of the test bank 505, and many uses of the emulated peripherals are within contemplation of this discussion.

As illustrated above, some aspects of the disclosure provide a method of virtualization and system for supporting same. In one arrangement, the method can include the steps of providing a native hardware layer that may represent the hardware associated with one or more communication devices and providing a virtual platform that supports different operating environments and that interacts with the native hardware layer to form a virtual test bank. The method can also include the step of providing an interface to enable a user to execute a testing session for an application with respect to at least one of the operating environments of the virtual platform that interacts with the native hardware layer.

What is disclosed herein thus includes at least the following sample embodiments:

1. A method of virtualization, comprising: providing a native hardware layer that represents the hardware associated with one or more communication devices; providing a virtual platform that supports different operating environments and that interacts with the native hardware layer to form a virtual test bank; and providing an interface to enable a user to execute a testing session for an application with respect to at least one of the operating environments of the virtual platform that interacts with the native hardware layer.
2. The method according to embodiment 1, wherein the different operating environments comprise different virtual operating systems or different versions of those virtual operating systems.
3. The method according to embodiment 2, wherein the different operating environments further include one or more emulated peripherals.
4. The method according to embodiment 3, wherein some of the emulated peripherals are common to at least two or more of the different virtual operating systems and some of the emulated peripherals are unique to at least one of the virtual operating systems.
5. The method according to embodiment 3, further comprising providing a client interface for transmission to an end-user machine that enables the installation of virtual driver extensions on the end-user machine to permit a user to interact with the emulated peripherals.
6. The method according to embodiment 2, wherein providing an interface comprises providing an interface to enable the user to execute the testing session for the application with respect to the virtual platform such that the testing session runs across the different operating environments.
7. The method according to embodiment 1, wherein providing the interface comprises: providing a web site that a user may access through a computer that is remote to the virtual test bank; or enabling a headless mode that allows for access to the virtual test bank and that bypasses the web site.
8. The method according to embodiment 7, wherein the web site includes a snapshot feature that permits the user to save a snapshot of the testing session for later re-launch of the testing session.
9. The method according to embodiment 7, wherein the web site includes a recording feature that permits the user to record the testing session.
10. The method according to embodiment 7, wherein the web site includes a sharing feature that permits the user to share a snapshot of the testing session, a recording of the testing session or a live transmission of the testing session.
11. A virtual test bank, comprising: an interface that is configured to receive communications signals from one or more end-user machines; and a plurality of processing units that form a native hardware layer, wherein the processing units are configured to support a virtual platform that presents different operating environments such that the virtual test bank enables the testing of applications with respect to one or more of the different operating environments.
12. The virtual test bank according to embodiment 11, wherein the different operating environments include different virtual operating systems or different versions of those virtual operating systems such that the virtual test bank enables simultaneous testing of an application with respect to a plurality of different virtual operating environments.
13. The virtual test bank according to embodiment 11, wherein the virtual platform is further configured to present a hypervisor that supports one or more emulated peripherals and the emulated peripherals are part of the different operating environments.
14. A method of testing an application over a plurality of different operating environments, comprising: at an end-user machine, launching a virtual client that includes one or more virtual driver extensions; accessing through the end-user machine a virtual test bank that supports multiple different virtual operating environments that interact with a native hardware layer; and initiating on the end-user machine a testing session for an application with respect to the multiple different virtual operating environments.
15. The method according to embodiment 14, wherein initiating the testing session for the application comprises initiating the testing session for the application with respect to the multiple different virtual operating environments in a simultaneous manner.

16. The method according to embodiment 14, wherein the different virtual operating environments include one or more emulated peripherals and the method further comprises accessing one or more of the emulated peripherals at the virtual text bank through the virtual driver extensions.

17. The method according to embodiment 14, further comprising one or more of the following: capturing a snapshot of the testing session for later re-launch of the testing session; recording at least a portion of the testing session; or sharing the snapshot of the testing session, the recorded portion of the testing session or a live transmission of the testing session.

18. A machine for testing applications, comprising: a display unit that is configured to display a portal that enables a user to a access a remote virtual test bank; and a processing unit, wherein the processing unit is configured to: cause a connection to be established with the virtual test bank, wherein the virtual test bank supports multiple different virtual operating environments; establish a testing session over the connection for an application installed on or accessible to the machine such that the user tests the application over the multiple different virtual operating environments.

19. The machine according to embodiment 18, further comprising an interface that is configured to receive a virtual client that includes one or more virtual client extensions and wherein the different virtual operating environments support one or more emulated peripherals; wherein the processing unit is further configured to enable the user to access the emulated peripherals through the virtual client extensions.

20. The machine according to embodiment 18, wherein the processing unit is further configured to: cause a snapshot of the testing session to be captured; cause at least a portion of the testing session to be recorded; or cause the snapshot, the recorded portion or a live transmission of the testing session to be shared.

Having discussed several examples of providing testing environments using virtualization, as well as several sample embodiments that are supported by and encompassed by one or more aspects of the disclosure, several additional examples and embodiments will be discussed in greater detail below.

Figure 8:
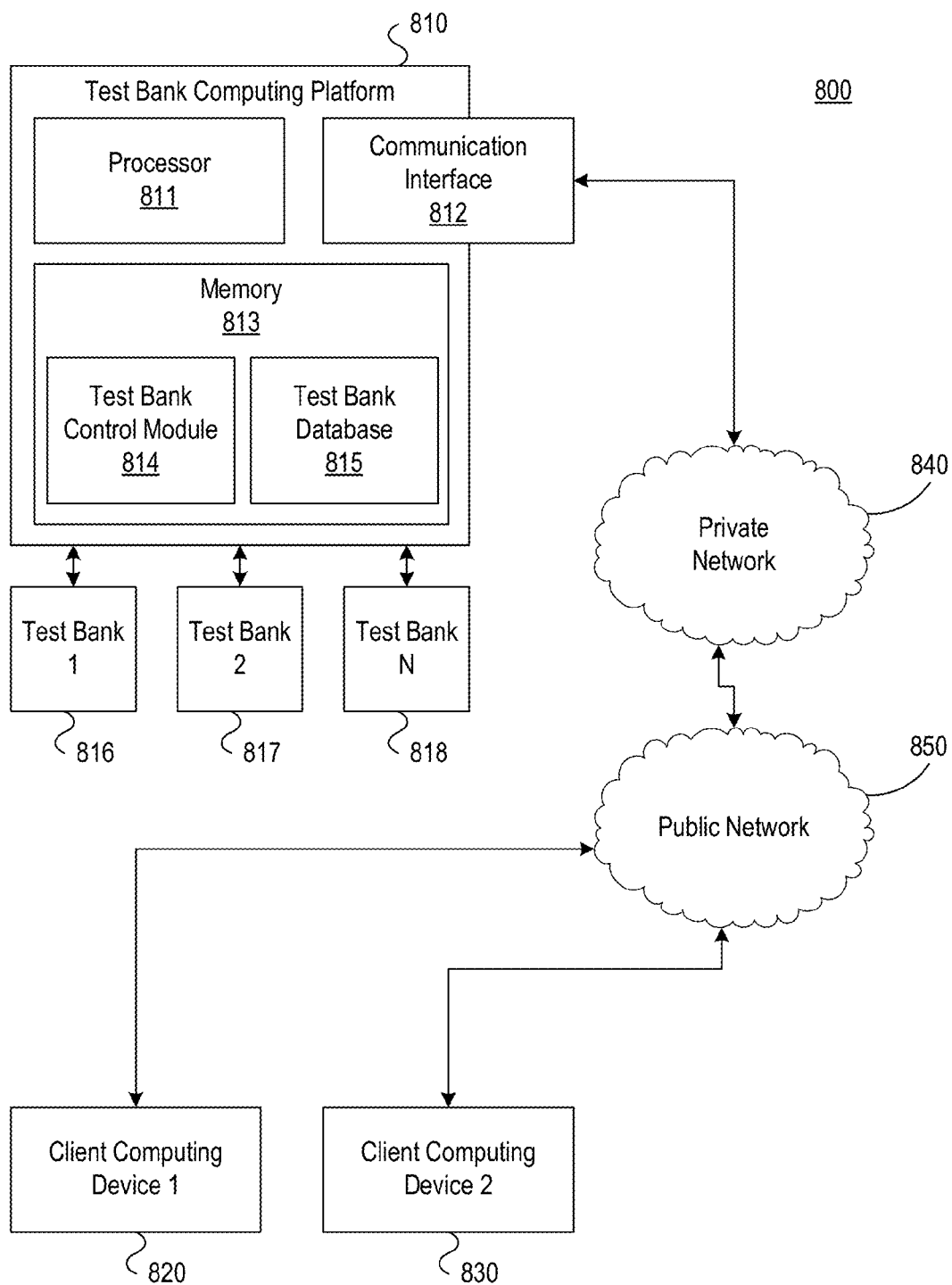
FIG. 8 depicts an illustrative computing environment for providing testing environments using virtualization in accordance with one or more example embodiments.

FIG. 8 depicts an illustrative computing environment for providing testing environments using virtualization in accordance with one or more example embodiments. Referring to FIG. 8, computing environment 800 may include one or more computing devices. For example, computing environment 800 may include one or more client computing devices, such as client computing device 820 (which may, e.g., be operated by a first user of a test bank) and client computing device 830 (which may, e.g., be operated by a second user of the test bank different from the first user of the test bank). In some instances, client computing device 820 and/or client computing device 830 may implement, incorporate, and/or otherwise include one or more aspects of end-user computer 510.

Client computing device 820 and client computing device 830 may be any type of computing device capable of receiving and processing input via one or more user interfaces, providing output via one or more user interfaces and communicating input, output, and/or other information to and/or from one or more other computing devices. For example, client computing device 820 and client computing device 830 may be a server computer, a desktop computer, laptop computer, tablet computer, smart phone, or the like. In addition, and as illustrated in greater detail below, any and/or all of client computing device 820 and client computing device 830 may, in some instances, be special-purpose computing devices configured to perform specific functions.

Computing environment 800 also may include one or more computing platforms. For example, computing environment 800 may include test bank computing platform 810. Test bank computing platform 810 may include one or more computing devices configured to perform one or more of the various functions described herein. For example, test bank computing platform 810 may include one or more computers (e.g., laptop computers, desktop computers, servers, etc.).

Computing environment 800 also may include one or more networks, which may interconnect one or more of client computing device 820, client computing device 830, and test bank computing platform 810. For example, computing environment 800 may include a private network 840 (which may, e.g., be operated by and/or associated with an organization that operates test bank computing platform 810 and which may include one or more local area networks, wide area networks, virtual private networks, etc.) and a public network 850 (which may, e.g., include the internet and/or one or more networks and which may interconnect private network 840 and one or more computing devices connected thereto, such as test bank computing platform 810, or one or more remote computing devices, such as client computing device 820 and/or client computing device 830).

As illustrated in FIG. 8, test bank computing platform 810 may include one or more processors 811, memory 813, and a communication interface 812. Memory 813 may store and/or otherwise include one or more program modules that include instructions that, when executed by the one or more processors 811, cause test bank computing platform 810 to perform one or more functions described herein. For example, memory 813 may store and/or otherwise include test bank control module 814, which may include instructions that, when executed by the one or more processors 811, cause test bank computing platform 810 to perform one or more functions described herein, such as providing one or more testing environments. In addition, memory 813 may store, maintain, and/or otherwise provide one or more databases, such as test bank database 815, in which test bank computing platform 810 may store and/or maintain various types of information, including information associated with providing one or more testing environments. Additionally, communication interface 812 may be a network interface configured to support communication between test bank computing platform 810 and private network 840, public network 850, and/or one or more sub-networks thereof.

As further illustrated in FIG. 8, test bank computing platform 810 may communicate with and/or manage one or more test banks, such as test bank 816, test bank 817, and test bank 818. Any and/or all of test bank 816, test bank 817, and test bank 818 may implement, incorporate, and/or otherwise include one or more aspects of test bank 505. In some arrangements, any and/or all of test bank 816, test bank 817, and test bank 818 may be incorporated in test bank computing platform 810, while in other arrangements, test bank 816, test bank 817, and/or test bank 818 may be made up of and/or include one or more computer systems that are in communication with but separate from test bank computing platform 810. As illustrated in greater detail below, test bank computing platform 810 may, in some instances, command, control, and/or otherwise manage one or more test banks, such as test bank 816, test bank 817, and/or test bank 818, to provide one or more testing environments to one or more remote client computing devices, such as client computing device 820 and/or client computing device 830.

Figure 9A:
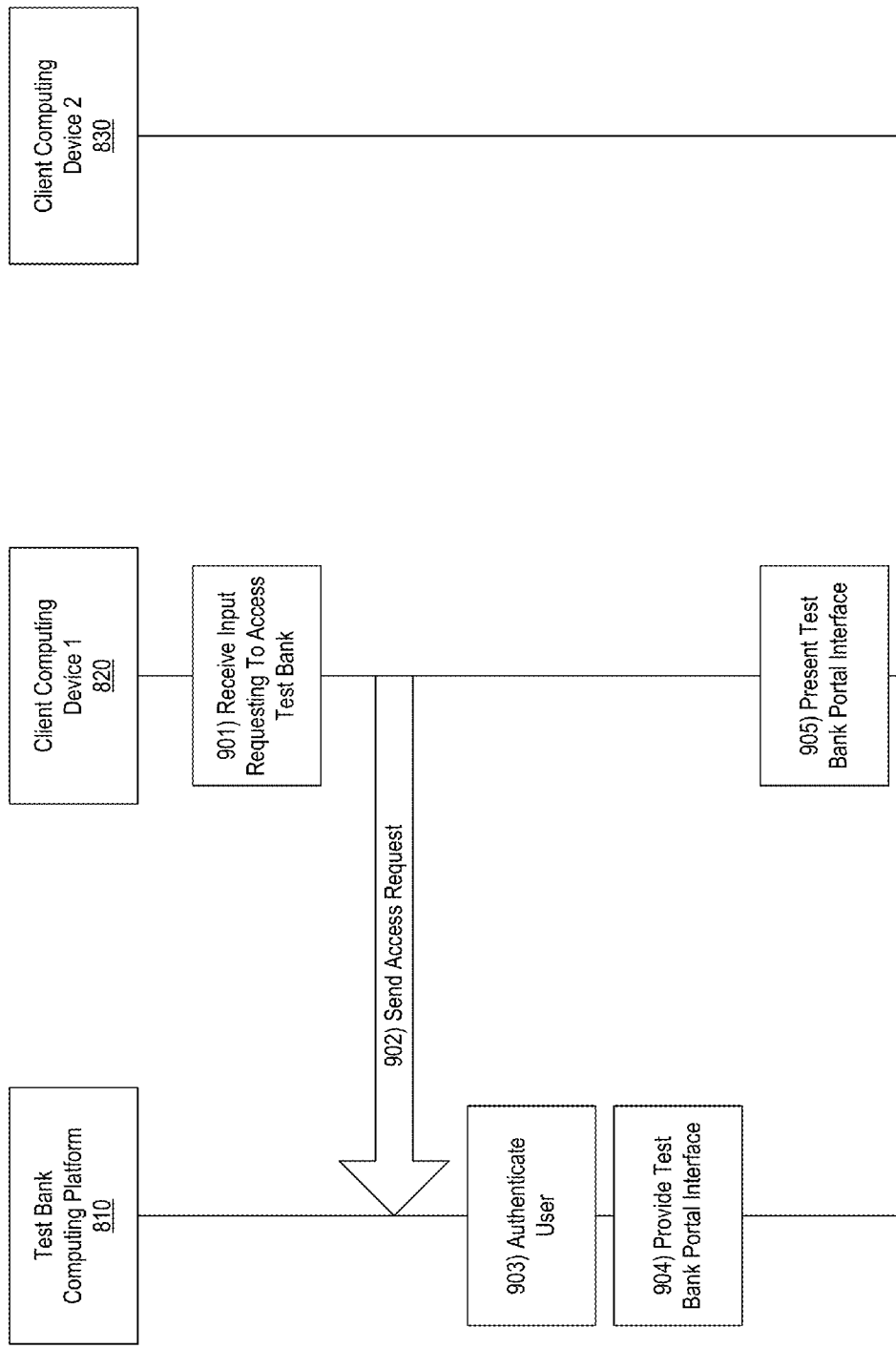

FIGS. 9A-9K depict an example event sequence for providing testing environments using virtualization in accordance with one or more example embodiments. Referring to FIG. 9A, at step 901, client computing device 820 may receive input request to access an application test bank (which may, e.g., be managed, controlled, and/or otherwise provided by test bank computing platform 810). At step 902, client computing device 820 may send an access request to test bank computing platform 810 (e.g., to request access to and/or establish a connection with test bank computing platform 810). At step 903, test bank computing platform 810 may authenticate the user of client computing device 820 (e.g., by prompting the user of client computing device 820 to enter one or more login credentials, such as a username and a password, associated with a user account that may be maintained by test bank computing platform 810 for the user of client computing device 820 in connection with testing one or more software applications in one or more testing environments provided by test bank computing platform 810).

Figures 10, 11:
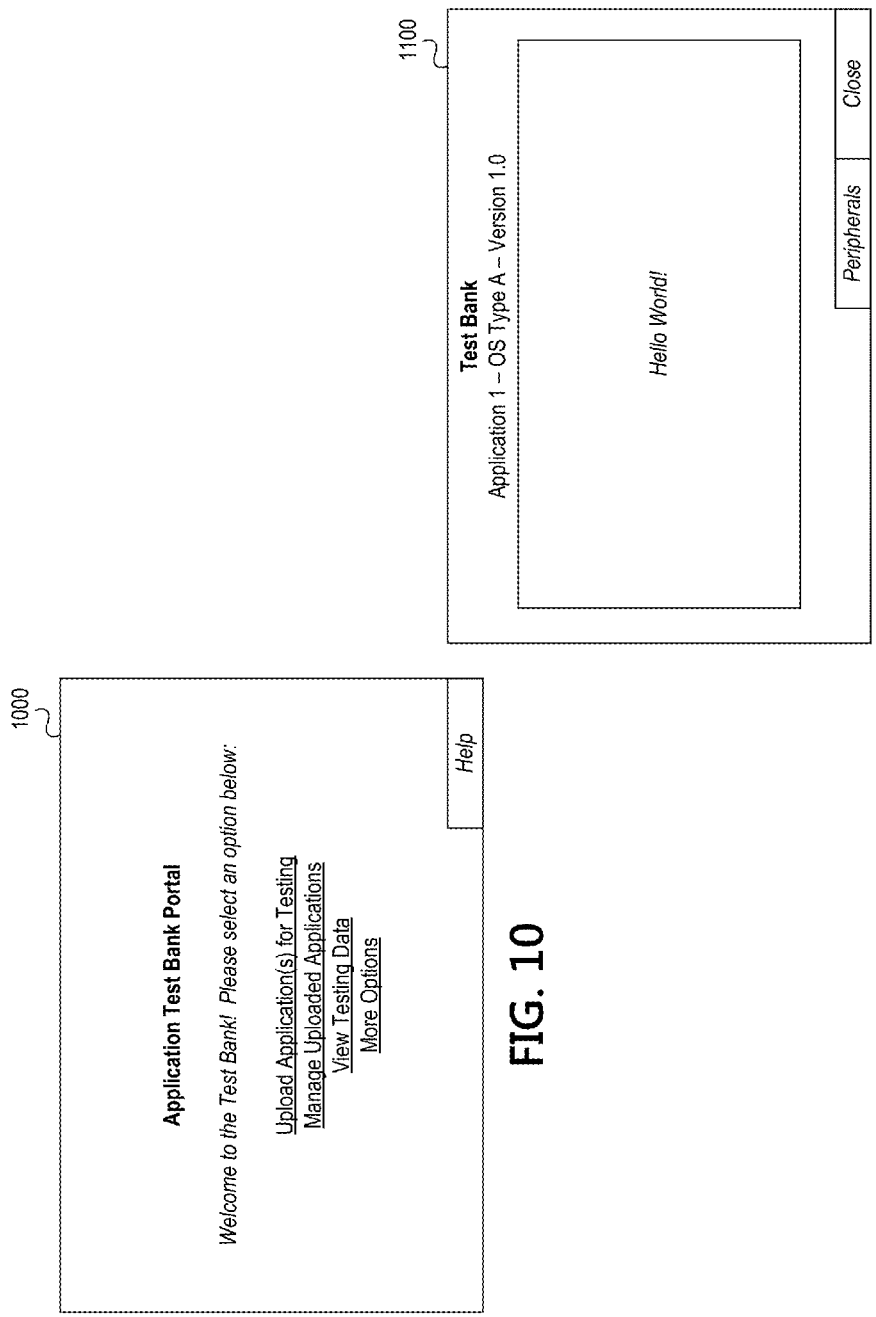
FIGS. 10-15 depict example graphical user interfaces for providing testing environments using virtualization in accordance with one or more example embodiments.

At step 904, test bank computing platform 810 may provide a test bank portal interface to client computing device 820. At step 905, client computing device 820 may present the test bank portal interface (e.g., to the user of client computing device 820, via one or more display devices connected to and/or otherwise associated with client computing device 820). For example, in presenting such a test bank portal interface, client computing device 820 may display and/or otherwise present a graphical user interface similar to graphical user interface 1000, which is illustrated in FIG. 10. As seen in FIG. 10, the test bank portal user interface may enable the user of client computing device 820 to upload one or more software applications to be tested in one or more virtualized testing environments provided by test bank computing platform 810, manage one or more previously-uploaded software applications, view testing data associated with previously-tested software applications, and/or provide other functions.

Referring to FIG. 9B, at step 906, client computing device 820 may receive input selecting a first application for testing (e.g., from the user of client computing device 820, via one or more user interfaces provided by test bank computing platform 810 and/or presented by client computing device 820 in connection with the test bank portal user interface). At step 907, client computing device 820 may send the first application to test bank computing platform 810. In sending the first application to test bank computing platform 810, client computing device 820 may, for instance, upload, transmit, and/or otherwise transfer to test bank computing platform 810 a copy of the first application to be tested in a testing environment provided by and/or managed by test bank computing platform 810.

At step 908, test bank computing platform 810 may receive the first application from test bank computing platform 810. For example, at step 908, test bank computing platform 810 may receive, via the communication interface (e.g., communication interface 812), and from a first client computing device (e.g., client computing device 820), a first software application. At step 909, client computing device 820 may receive input defining one or more testing parameters (e.g., from the user of client computing device 820). Such input may, for instance, specify one or more parameters for testing the first software application, such as a specific version of a specific operating system on which the first software application should be tested, a specific version of a specific device firmware on which the first software application should be tested, a specific screen size and/or screen resolution at which the first software application should be tested, and/or other parameters. At step 910, client computing device 820 may send the one or more testing parameters to test bank computing platform 810 (e.g., so as to facilitate testing of the first software application by test bank computing platform 810 in accordance with such parameters).

Referring to FIG. 9C, at step 911, test bank computing platform 810 may receive the one or more testing parameters from client computing device 820. For example, at step 911, test bank computing platform 810 may receive, via the communication interface (e.g., communication interface 812), and from the first client computing device (e.g., client computing device 820), a first set of one or more testing parameters for testing the first software application. In some instances, the first set of one or more testing parameters for testing the first software application may include one or more of an operating system version parameter, a firmware version parameter, a screen size parameter, a screen resolution parameter, or an available virtual hardware parameter. For example, the one or more testing parameters that test bank computing platform 810 may receive from client computing device 820 at step 911 may include an operating system version parameter (e.g., specifying a specific version of a specific operating system on which the first software application should be tested), a firmware version parameter (e.g., specifying a specific version of a specific device firmware on which the first software application should be tested), a screen size parameter (e.g., specifying a specific screen size at which the first software application should be tested), a screen resolution parameter (e.g., specifying a specific screen resolution at which the first software application should be tested), and/or an available virtual hardware parameter (e.g., specifying one or more virtual hardware devices that may be used by and/or should be made available to the first software application in a particular testing environment, such as one or more virtual hardware devices that may emulate cellular network access, accelerometer and/or gyroscopic input, and/or other types of hardware input and/or output in the testing environment).

At step 912, test bank computing platform 810 may create a testing environment for the first application based on the one or more testing parameters. For example, at step 912, test bank computing platform 810 may create, based on the first set of one or more testing parameters for testing the first software application, a first testing environment for the first software application using a native hardware layer that represents hardware on which the first software application is configured to be executed. In some instances, creating the first testing environment for the first software application may include initializing a virtual machine based on the first set of one or more testing parameters for testing the first software application. For example, in creating the first testing environment for the first software application (e.g., at step 912), test bank computing platform 810 may initialize a virtual machine based on the first set of one or more testing parameters for testing the first software application. For instance, test bank computing platform 810 may initialize a virtual machine running a specific version of a specific operating system, on a specific device firmware, at a specific display screen size and/or screen resolution, and/or having one or more specific available virtual hardware devices, as may be specified in the testing parameters.

In some instances, the native hardware layer may include one or more processing cores associated with one or more mobile communication devices on which the first software application is configured to be executed. For example, the native hardware layer (which may, e.g., be used by test bank computing platform 810 in creating the testing environment at step 912) may include one or more processing cores associated with one or more mobile communication devices on which the first software application is configured to be executed. For instance, the first software application may be designed for, developed for, and/or otherwise configured to be executed in a specific mobile device operating environment (e.g., iOS, Android, etc.), and the native hardware layer may include one or more processing cores that are designed to be included in and/or otherwise associated with such a specific mobile device operating environment.

In some instances, the hardware on which the first software application is configured to be executed is different from hardware associated with the first client computing device (e.g., client computing device 820). For instance, the first software application may be configured to be executed in a specific mobile device operating environment, while the hardware associated with the first client computing device (e.g., client computing device 820) may include one or more components that are not designed to provide such a specific mobile device operating environment (e.g., as such components may provide a desktop operating environment or a desktop operating system, such as Windows or Mac OS X, on the client computing device).

At step 913, test bank computing platform 810 may initiate a testing session. For example, at step 913, test bank computing platform 810 may initiate a first testing session in which the first software application is executed in the first testing environment. In executing the first software application in the first testing environment, test bank computing platform 810 may virtualize the first software application, as the first software application may be executed by test bank computing platform 810 using a native hardware layer (which may, e.g., be provided by a test bank, such as test bank 816, test bank 817, test bank 818, which may be managed and/or controlled by test bank computing platform 810). In other words, test bank computing platform 810 may virtualize the first software application because test bank computing platform 810 may cause the first software application to be executed on a processing core and in an operating environment for which the first software application has been designed, built, and/or compiled. Thus, in executing the first software application, test bank computing platform 810 might not perform any translation of the software application's function calls, as the software application may simply execute on the native hardware layer using its existing, native application programming interfaces (e.g., as distinguished from simulation, in which such translation might be required). By virtualizing the software application in this manner, the application may be tested and executed in the form in which it is to be distributed to various end users, and only one or more peripherals might be emulated to the processing core(s) executing the software application, for example.

At step 914, test bank computing platform 810 may provide a control interface to client computing device 820. For example, at step 914, test bank computing platform 810 may provide, via the communication interface (e.g., communication interface 812), and to the first client computing device (e.g., client computing device 820), a first control interface for controlling the first testing session. Such a control interface may, for example, enable client computing device 820 and/or the user of client computing device 820 to interact with and/or control the first software application in the testing environment. In some instances, the control interface may enable client computing device 820 and/or the user of client computing device 820 to define and/or otherwise a specify a testing script, which may be executed by test bank computing platform 810 to automatically execute and/or test specific functions of the software application. In running such a testing script, test bank computing platform 810 may record information indicative of how the software application responds to various inputs provided to the software application by test bank computing platform 810 in accordance with the testing script. For example, if the software application crashes, test bank computing platform 810 can capture a snapshot of information associated with the crash and provide such information to client computing device 820 and/or to a bug tracking system on test bank computing platform 810 and/or client computing device 820.

In some instances, the first control interface for controlling the first testing session may be provided to the first client computing device via a website. For example, in providing a control interface to client computing device 820, test bank computing platform 810 may provide a website that includes one or more graphical user interfaces and/or other content to client computing device 820. Such a website may, for instance, enable the user of client computing device 820 to view and/or interact with the software application in the testing environment.

At step 915, client computing device 820 may present the control interface. For example, in presenting such a control interface, client computing device 820 may display and/or otherwise present a graphical user interface similar to graphical user interface 1100, which is illustrated in FIG. 11. As seen in FIG. 11, the control interface may enable the user of client computing device 820 to view and/or interact with the software application in the testing environment.

Referring to FIG. 9D, at step 916, test bank computing platform 810 may receive user input for the first application. For example, at step 916, test bank computing platform 810 may receive, via the first control interface, and during the first testing session, first user input for the first software application. At step 917, test bank computing platform 810 may provide the user input to the first application. For example, at step 917, test bank computing platform 810 may provide the first user input to the first software application in the first testing environment. At step 918, test bank computing platform 810 may update the control interface. For example, at step 918, test bank computing platform 810 may update the first control interface (e.g., by providing an updated control interface and/or one or more updated user interfaces associated with the updated control interface to client computing device 820). At step 919, client computing device 820 may present the updated control interface (e.g., by displaying and/or otherwise presenting one or more graphical user interfaces associated with the updated control interface).

Figure 9E:
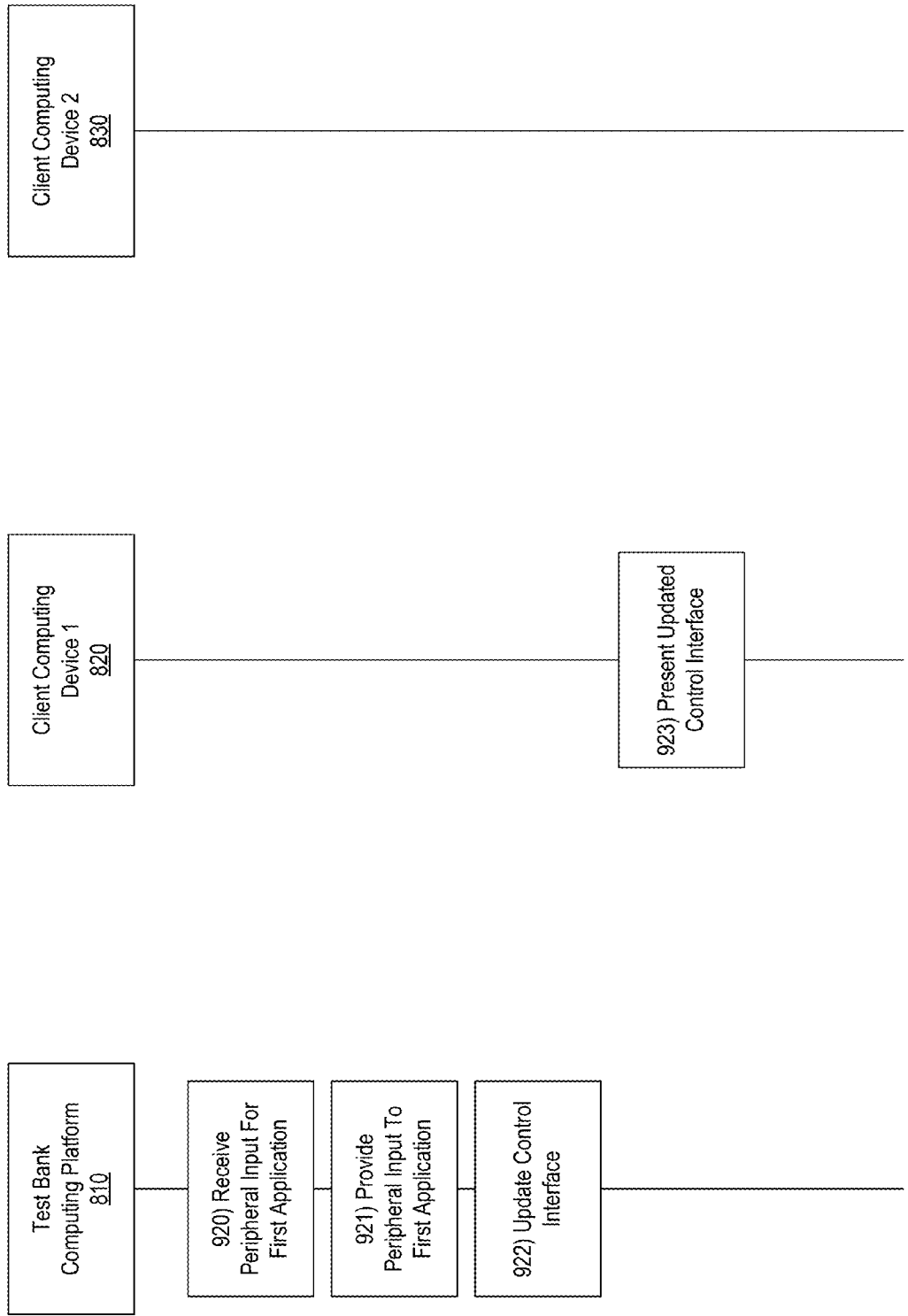

Referring to FIG. 9E, at step 920, test bank computing platform 810 may receive peripheral input for the first application. For example, at step 920, test bank computing platform 810 may receive, via the first control interface, and during the first testing session, first peripheral input for the first software application. In some instances, the first peripheral input for the first software application may be received via one or more virtual driver extensions on the first client computing device. For example, the first peripheral input for the first software application (which may, e.g., be received by test bank computing platform 810 at step 920) may be received via one or more virtual driver extensions on the first client computing device (e.g., client computing device 820). As discussed above, such virtual driver extensions may enable the user of client computing device 820 (which may, e.g., implement and/or incorporate one or more aspects of end-user computer 510) to interact with one or more emulated peripherals that may be provided by test bank computing platform 810 and/or by a test bank (e.g., test bank 816, test bank 817, test bank 818) controlled by test bank computing platform 810 to provide the testing environment for the software application.

Figure 12:
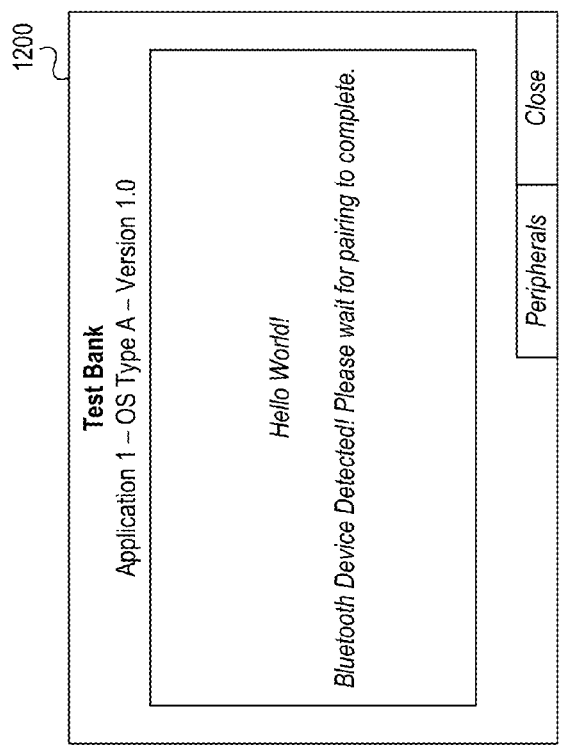

At step 921, test bank computing platform 810 may provide the peripheral input to the first application. For example, at step 921, test bank computing platform 810 may provide the first peripheral input to the first software application in the first testing environment using one or more emulated peripherals associated with the first testing environment. In providing such peripheral input, test bank computing platform 810 and/or a test bank (e.g., test bank 816, test bank 817, test bank 818) controlled by test bank computing platform 810 may translate emulated peripheral input and/or output to the native core executing the software application in the virtualized testing session. For example, if the native core draws to emulated peripheral graphics hardware while executing the software application, test bank computing platform 810 and/or a hypervisor associated with the test bank controlled by test bank computing platform 810 may translate such drawing to a frame buffer, thereby allowing the user of client computing device 820 to view the graphics output on a display device connected to client computing device 820. At step 922, test bank computing platform 810 may update the control interface. For example, at step 922, test bank computing platform 810 may update the first control interface (e.g., by providing an updated control interface and/or one or more updated user interfaces associated with the updated control interface to client computing device 820). At step 923, client computing device 820 may present the updated control interface (e.g., by displaying and/or otherwise presenting one or more graphical user interfaces associated with the updated control interface). For example, in presenting such an updated control interface, client computing device 820 may display and/or otherwise present a graphical user interface similar to graphical user interface 1200, which is illustrated in FIG. 12. As seen in FIG. 12, the control interface may enable the user of client computing device 820 to view and/or interact with the software application in the testing environment and further may include information reflecting operations performed by and/or in connection with the one or more emulated peripherals. For instance, in the example shown in FIG. 12, the software application may respond to input received in connection with an emulated Bluetooth peripheral, and this response may be reflected in the graphical user interface presented in connection with the updated control interface.

Referring to FIG. 9F, at step 924, client computing device 820 may receive input defining one or more second testing parameters (which may, e.g., be different from the testing parameters initially defined at step 911, in that they may specify a different operating system version parameter, a different firmware version parameter, a different screen size parameter, a different screen resolution parameter, and/or one or more other different parameters). At step 925, client computing device 820 may send the one or more second testing parameters to test bank computing platform 810. At step 926, test bank computing platform 810 may receive the one or more second testing parameters. For example, at step 926, test bank computing platform 810 may receive, via the communication interface (e.g., communication interface 812), and from the first client computing device (e.g., client computing device 820), a second set of one or more testing parameters for testing the first software application. The second set of one or more testing parameters for testing the first software application may, for example, be different from the first set of one or more testing parameters for testing the first software application. For example, the second set of one or more testing parameters for testing the first software application may specify a different operating system version parameter, a different firmware version parameter, a different screen size parameter, a different screen resolution parameter, a different available virtual hardware parameter, and/or one or more other parameters different from corresponding parameters specified in the first set of one or more testing parameters for testing the first software application.

At step 927, test bank computing platform 810 may create a second testing environment. For example, at step 927, test bank computing platform 810 may create, based on the second set of one or more testing parameters for testing the first software application, a second testing environment for the first software application using the native hardware layer that represents the hardware on which the first software application is configured to be executed. In some instances, creating the second testing environment for the first software application may include initializing a second virtual machine based on the second set of one or more testing parameters for testing the first software application. For example, in creating the second testing environment for the first software application (e.g., at step 927), test bank computing platform 810 may initialize a second virtual machine based on the second set of one or more testing parameters for testing the first software application. For instance, test bank computing platform 810 may initialize a virtual machine running a specific version of a specific operating system, on a specific device firmware, and/or at a specific display screen size and/or screen resolution, as may be specified in the second set of one or more testing parameters.

At step 928, test bank computing platform 810 may initiate a second testing session. For example, at step 928, test bank computing platform 810 may initiate a second testing session in which the first software application is executed in the second testing environment. In executing the first software application in the second testing environment, test bank computing platform 810 may virtualize the first software application, as the first software application may be executed by test bank computing platform 810 using a native hardware layer (which may, e.g., be provided by a test bank, such as test bank 816, test bank 817, test bank 818, which may be managed and/or controlled by test bank computing platform 810), similar to how the first software application may be executed in the first testing environment, as discussed above.

Figure 9G:
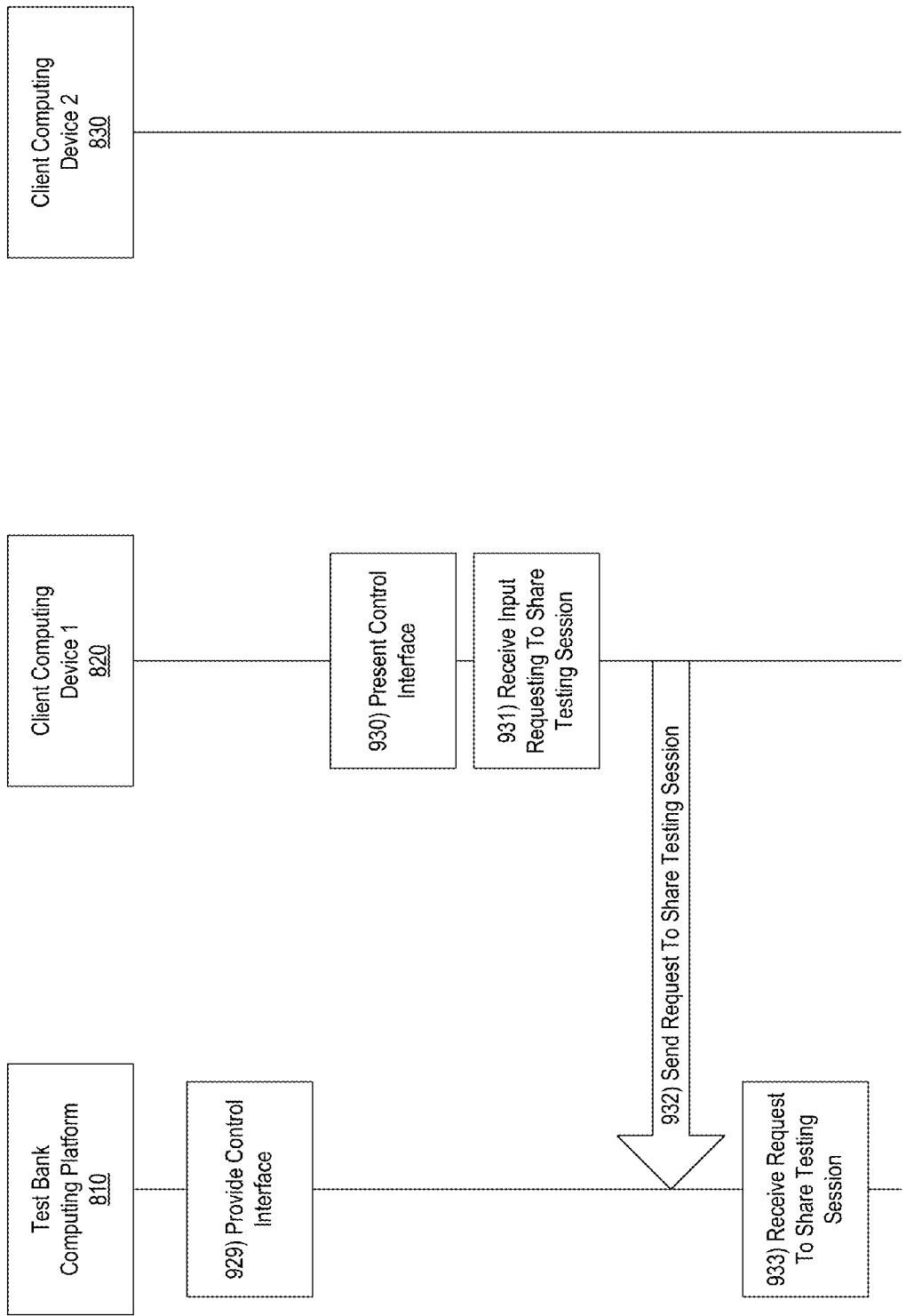

Referring to FIG. 9G, at step 929, test bank computing platform 810 may provide a control interface to client computing device 820. For example, at step 929, test bank computing platform 810 may provide, via the communication interface (e.g., communication interface 812), and to the first client computing device (e.g., client computing device 820), a second control interface for controlling the second testing session. Such a control interface may, for example, enable client computing device 820 and/or the user of client computing device 820 to interact with and/or control the first software application in the second testing environment, similar to the first control interface discussed above.

Figure 13:
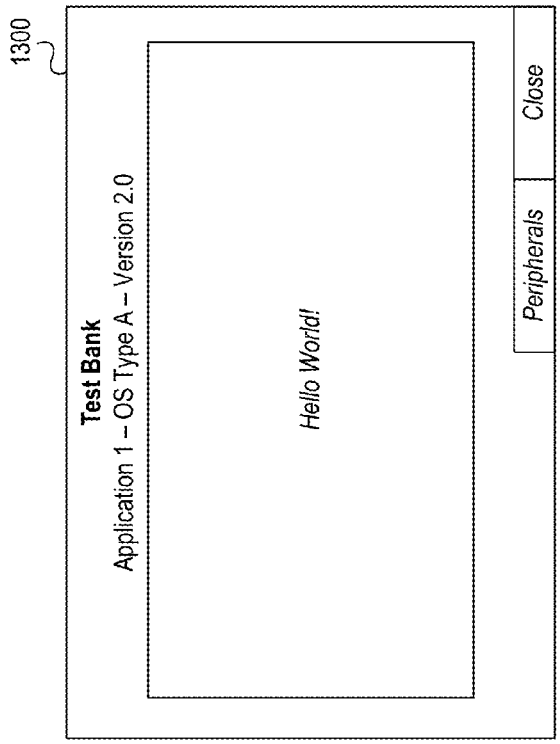

At step 930, client computing device 820 may present the control interface. For example, in presenting such a control interface, client computing device 820 may display and/or otherwise present a graphical user interface similar to graphical user interface 1300, which is illustrated in FIG. 13. As seen in FIG. 13, the control interface may enable the user of client computing device 820 to view and/or interact with the software application in the testing environment. As also seen in FIG. 13, the control interface may reflect that the software application is being executing in a different operating environment defined by different parameters (e.g., a different version of the operating system in the example illustrated in FIG. 13).

Figure 14:
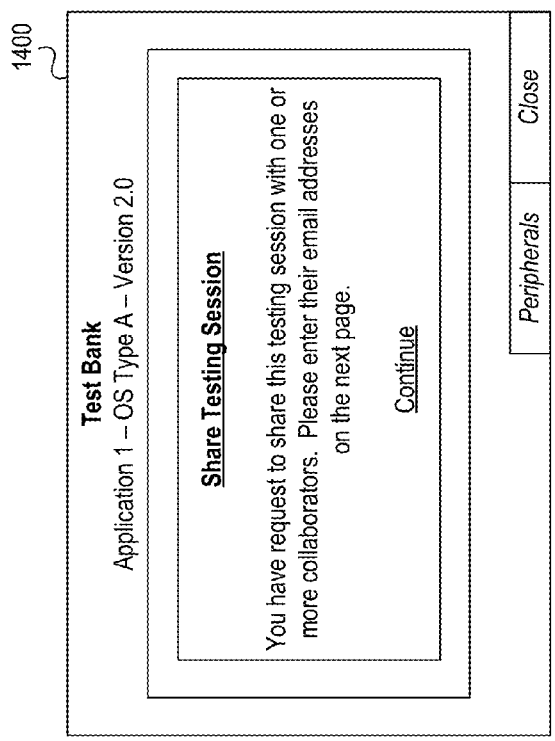

Referring again to FIG. 9G, at step 931, client computing device 820 may receive input requesting to share the testing session. In some instances, in receiving such input, client computing device 820 may display and/or otherwise present a graphical user interface similar to graphical user interface 1400, which is illustrated in FIG. 14. As seen in FIG. 14, the user interface may enable the user of client computing device 820 to share one or more specific testing sessions with one or more specific collaborators.

Figure 9H:
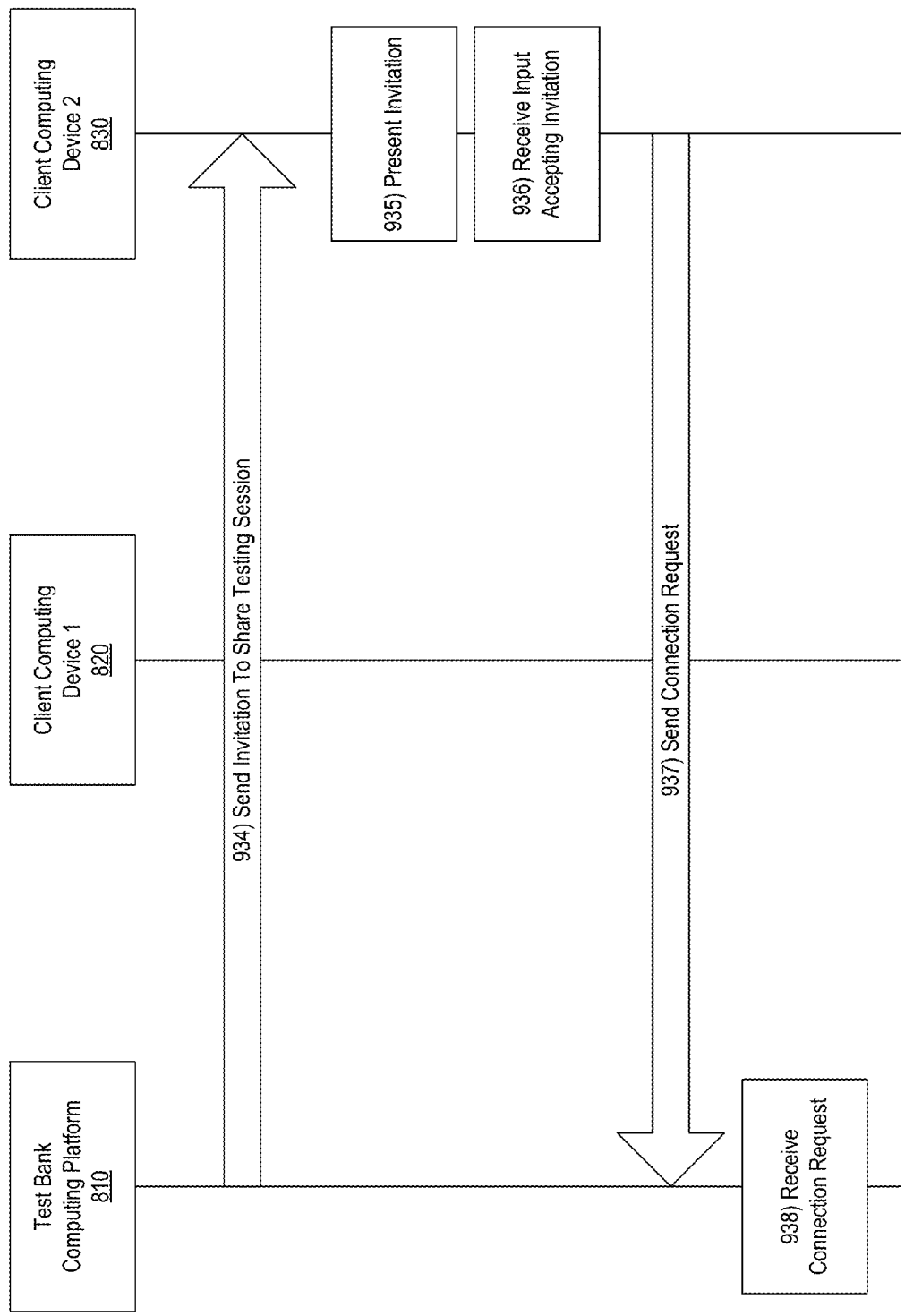

Referring again to FIG. 9G, at step 932, client computing device 820 may send a request to share the testing session to test bank computing platform 810 (e.g., and the request may include information identifying one or more collaborators with which the testing session is to be shared). At step 933, test bank computing platform 810 may receive the request to share the testing session. For example, at step 933, test bank computing platform 810 may receive, via the communication interface (e.g., communication interface 812), and from the first client computing device (e.g., client computing device 820), a request to share the first testing session. Referring to FIG. 9H, at step 934, test bank computing platform 810 may send an invitation to share the testing session to client computing device 830. At step 935, client computing device 830 may present the invitation (e.g., by displaying and/or otherwise presenting one or more graphical user interfaces that include information associated with the invitation). At step 936, client computing device 830 may receive input accepting the invitation. At step 937, client computing device 830 may send a connection request to test bank computing platform 810. At step 938, test bank computing platform 810 may receive the connection request from client computing device 830.

Figure 9I:
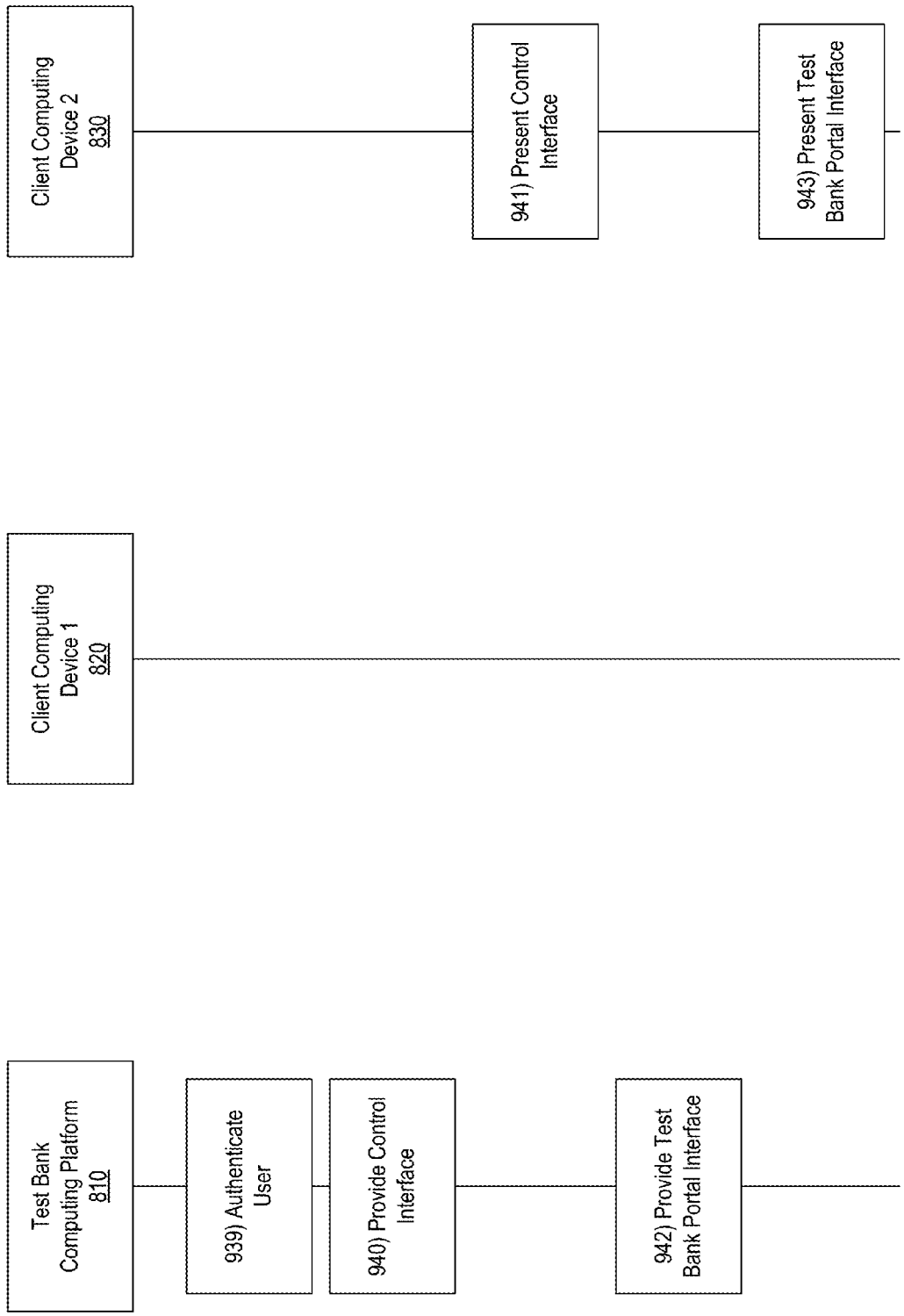

Referring to FIG. 9I, at step 939, test bank computing platform 810 may authenticate the user of client computing device 830. At step 940, test bank computing platform 810 may provide a control interface to client computing device 830. For example, at step 940, test bank computing platform 810 may provide, via the communication interface (e.g., communication interface 812), and to a second client computing device (e.g., client computing device 830) different from the first client computing device (e.g., client computing device 820), a second control interface for controlling the first testing session based on the request to share the first testing session.

Figure 15:
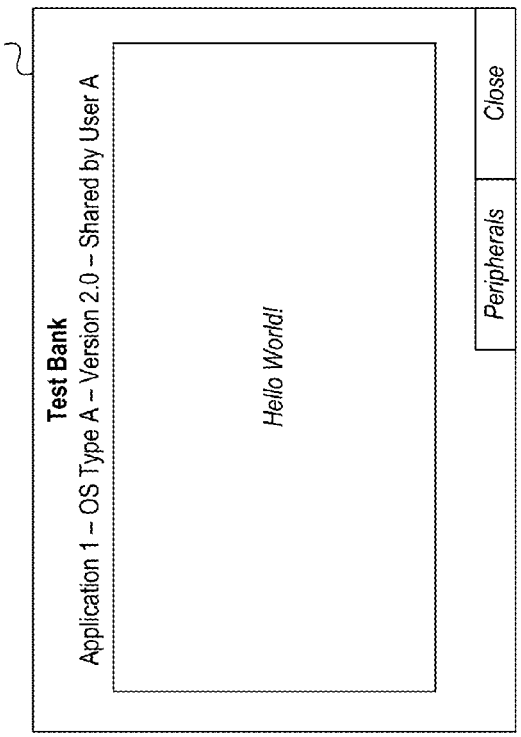

At step 941, client computing device 830 may present the control interface. For example, in presenting such a control interface, client computing device 830 may display and/or otherwise present a graphical user interface similar to graphical user interface 1500, which is illustrated in FIG. 15. As seen in FIG. 15, the control interface may enable the user of client computing device 830 to view and/or interact with the first software application in the first testing environment and/or in the second testing environment. As also seen in FIG. 15, such interaction may be provided in connection with a shared session with another user of test bank computing platform 810 (e.g., the user of client computing device 820 in the example illustrated in FIG. 15).

At step 942, test bank computing platform 810 may provide a test bank portal interface to client computing device 830. For example, after authenticating the user of client computing device 830 and/or providing a control interface in connection with a shared testing session, test bank computing platform 810 may provide client computing device 830 with a test bank portal interface (e.g., similar to how test bank computing platform 810 may provide such a test bank portal interface to client computing device 820 at step 904). At step 943, client computing device 830 may present the test bank portal interface.

Figure 9J:
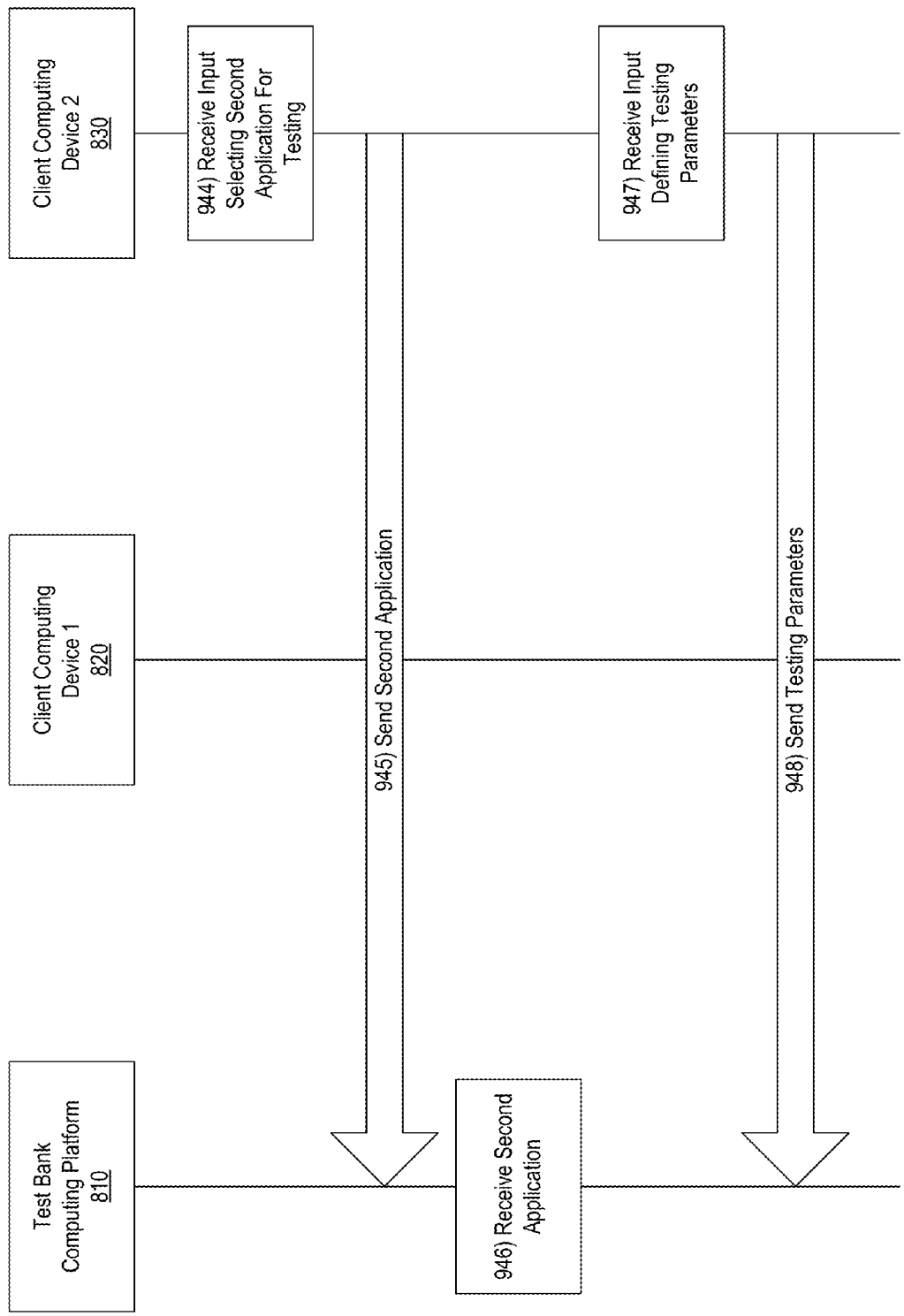

Referring to FIG. 9J, at step 944, client computing device 830 may receive input selecting a second application for testing. The second application may, for example, be different from the first application submitted for testing by the user of client computing device 820. At step 945, client computing device 830 may send the second application to test bank computing platform 810. At step 946, test bank computing platform 810 may receive the second application from client computing device 830. For example, at step 946, test bank computing platform 810 may receive, via the communication interface (e.g., communication interface 812), and from a second client computing device (e.g., client computing device 830), a second software application different from the first software application. At step 947, client computing device 830 may receive input defining one or more testing parameters for the second software application. At step 948, client computing device 830 may send the one or more testing parameters for the second software application to test bank computing platform 810.

Referring to FIG. 9K, at step 949, test bank computing platform 810 may receive the one or more testing parameters. For example, at step 949, test bank computing platform 810 may receive, via the communication interface (e.g. communication interface 812), and from the second client computing device (e.g., client computing device 830), a second set of one or more testing parameters for testing the second software application. In some instances, the second set of one or more testing parameters for testing the second software application may include one or more of an operating system version parameter, a firmware version parameter, a screen size parameter, or a screen resolution parameter. For example, the one or more testing parameters that test bank computing platform 810 may receive from client computing device 830 at step 949 may include an operating system version parameter (e.g., specifying a specific version of a specific operating system on which the second software application should be tested), a firmware version parameter (e.g., specifying a specific version of a specific device firmware on which the second software application should be tested), a screen size parameter (e.g., specifying a specific screen size at which the second software application should be tested), and/or a screen resolution parameter (e.g., specifying a specific screen resolution at which the second software application should be tested).

At step 950, test bank computing platform 810 may create a testing environment for the second application. For example, at step 950, test bank computing platform 810 may create, based on the second set of one or more testing parameters for testing the second software application, a second testing environment for the second software application using a second native hardware layer that represents hardware on which the second software application is configured to be executed. In some instances, creating the second testing environment for the second software application may include initializing a second virtual machine based on the second set of one or more testing parameters for testing the second software application. For example, in creating the second testing environment for the second software application (e.g., at step 950), test bank computing platform 810 may initialize a second virtual machine based on the second set of one or more testing parameters for testing the second software application. For instance, test bank computing platform 810 may initialize a virtual machine running a specific version of a specific operating system, on a specific device firmware, and/or at a specific display screen size and/or screen resolution, as may be specified in the second set of one or more testing parameters. In some instances, the second native hardware layer that represents the hardware on which the second software application is configured to be executed may be different from the native hardware layer that represents the hardware on which the first software application is configured to be executed. For example, the second native hardware layer (which may, e.g., be used for testing the second application) may, in some instances, be different from the native hardware layer that may be used for testing the first application.

At step 951, test bank computing platform 810 may initiate a testing session for the second application. For example, at step 951, test bank computing platform 810 may initiate a second testing session in which the second software application is executed in the second testing environment. In executing the second software application in the second testing environment, test bank computing platform 810 may virtualize the second software application, as the second software application may be executed by test bank computing platform 810 using a native hardware layer (which may, e.g., be provided by a test bank, such as test bank 816, test bank 817, test bank 818, which may be managed and/or controlled by test bank computing platform 810). At step 952, test bank computing platform 810 may provide a control interface to client computing device 830. For example, at step 952, test bank computing platform 810 may provide, via the communication interface, and to the second client computing device, a second control interface for controlling the second testing session. Such a control interface may, for example, enable client computing device 830 and/or the user of client computing device 830 to interact with and/or control the first software application in the testing environment. At step 953, client computing device 830 may present the control interface (e.g., by displaying and/or otherwise presenting one or more graphical user interfaces).

Figure 16:
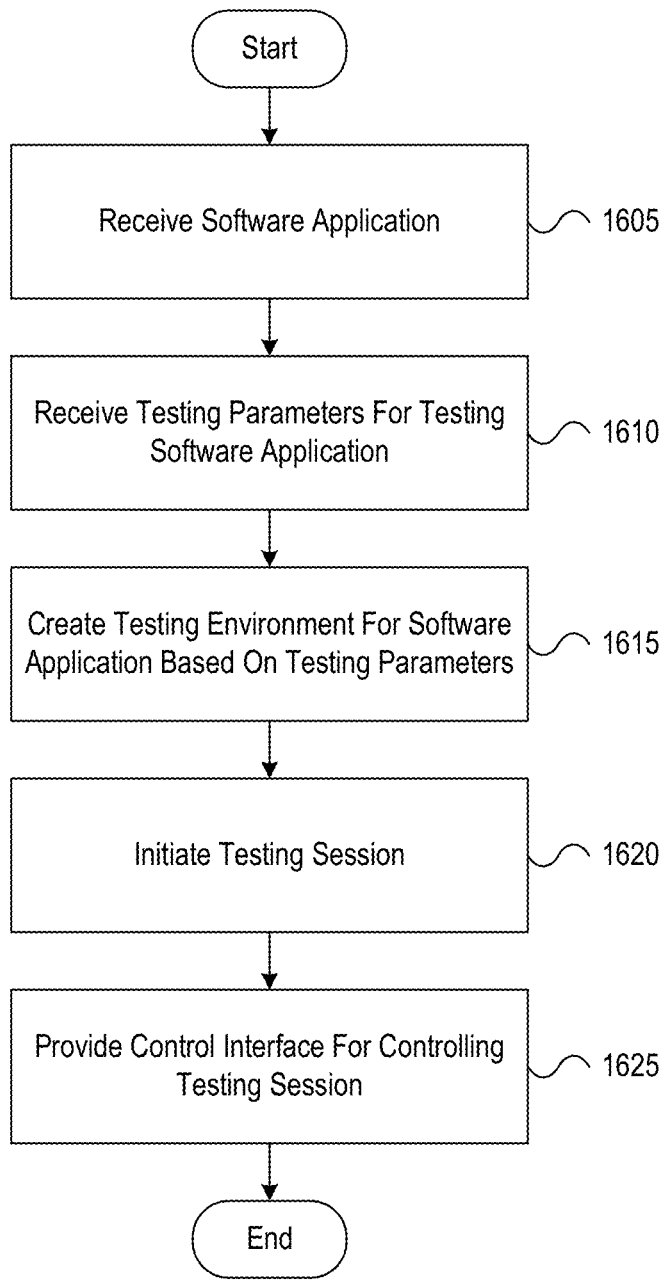
FIG. 16 depicts an illustrative method for providing testing environments using virtualization in accordance with one or more example embodiments.

FIG. 16 depicts an illustrative method for providing testing environments using virtualization in accordance with one or more example embodiments. Referring to FIG. 16, at step 1605, a computing platform may receive a software application. At step 1610, the computing platform may receive one or more testing parameters for testing the software application. At step 1615, the computing platform may create a testing environment for the software application based on the one or more testing parameters using a native hardware layer that represents hardware on which the software application is configured to be executed. At step 1620, the computing platform may initiate a testing session in which the software application is executing in the testing environment. At step 1625, the computing platform may provide a control interface for controlling the testing session.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system, comprising:
   at least one processor;
   a communication interface; and
   memory storing computer-readable instructions that, when executed by the at least one processor, cause the system to:
   receive, via the communication interface, and from a first client computing device, a first software application;
   receive, via the communication interface, and from the first client computing device, a first set of one or more testing parameters for testing the first software application;
   create, based on the first set of one or more testing parameters for testing the first software application, a first testing environment for the first software application using a native hardware layer that represents hardware on which the first software application is configured to be executed, wherein creating the first testing environment for the first software application comprises initializing a virtual machine based on the first set of one or more testing parameters for testing the first software application;
   initiate a first testing session in which the first software application is executed in the first testing environment;
   provide, via the communication interface, and to the first client computing device, a first control interface for controlling the first testing session;
   receive, via the communication interface, and from the first client computing device, a request to share the first testing session in which the first software application is executed in the first testing environment;
   based on receiving the request to share the first testing session, provide, via the communication interface, and to a second client computing device different from the first client computing device, a second control interface for controlling the first testing session in which the first software application is executed in the first testing environment; and
   prior to providing the second control interface for controlling the first testing session in which the first software application is executed in the first testing environment to the second client computing device:
       send, via the communication interface, to the second client computing device, an invitation to share the first testing session;
       receive, via the communication interface, from the second client computing device, a connection request; and
       based on receiving the connection request from the second client computing device, authenticate a user of the second client computing device.

2. The system of claim 1, wherein the first set of one or more testing parameters for testing the first software application comprises one or more of an operating system version parameter, a firmware version parameter, a screen size parameter, a screen resolution parameter, or an available virtual hardware parameter.

3. The system of claim 1, wherein the native hardware layer comprises one or more processing cores associated with one or more mobile communication devices on which the first software application is configured to be executed.

4. The system of claim 1, wherein the hardware on which the first software application is configured to be executed is different from hardware associated with the first client computing device.

5. The system of claim 1, wherein the first control interface for controlling the first testing session is provided to the first client computing device via a website.

6. The system of claim 1, wherein the memory stores additional computer-readable instructions that, when executed by the at least one processor, further cause the system to:
   receive, via the first control interface, and during the first testing session, first user input for the first software application;
   provide the first user input to the first software application in the first testing environment; and
   update the first control interface.

7. The system of claim 1, wherein the memory stores additional computer-readable instructions that, when executed by the at least one processor, further cause the system to:
   receive, via the first control interface, and during the first testing session, first peripheral input for the first software application;
   provide the first peripheral input to the first software application in the first testing environment using one or more emulated peripherals associated with the first testing environment; and
   update the first control interface.

8. The system of claim 1, wherein the memory stores additional computer-readable instructions that, when executed by the at least one processor, further cause the system to:
   receive, via the communication interface, and from the first client computing device, a second set of one or more testing parameters for testing the first software application;
   create, based on the second set of one or more testing parameters for testing the first software application, a second testing environment for the first software application using the native hardware layer that represents the hardware on which the first software application is configured to be executed;
   initiate a second testing session in which the first software application is executed in the second testing environment; and
   provide, via the communication interface, and to the first client computing device, a second third control interface for controlling the second testing session.

9. The system of claim 8, wherein creating the second testing environment for the first software application comprises initializing a second virtual machine based on the second set of one or more testing parameters for testing the first software application.

10. The system of claim 1, wherein the memory stores additional computer-readable instructions that, when executed by the at least one processor, further cause the system to:
    receive, via the communication interface, and from the second client computing device, a second software application different from the first software application;
    receive, via the communication interface, and from the second client computing device, a second set of one or more testing parameters for testing the second software application;
    create, based on the second set of one or more testing parameters for testing the second software application, a second testing environment for the second software application using a second native hardware layer that represents hardware on which the second software application is configured to be executed;
    initiate a second testing session in which the second software application is executed in the second testing environment; and
    provide, via the communication interface, and to the second client computing device, a third control interface for controlling the second testing session.

11. The system of claim 10, wherein the second set of one or more testing parameters for testing the second software application comprises one or more of an operating system version parameter, a firmware version parameter, a screen size parameter, or a screen resolution parameter.

12. The system of claim 10, wherein creating the second testing environment for the second software application comprises initializing a second virtual machine based on the second set of one or more testing parameters for testing the second software application.

13. The system of claim 10, wherein the second native hardware layer that represents the hardware on which the second software application is configured to be executed is different from the native hardware layer that represents the hardware on which the first software application is configured to be executed.

14. The system of claim 1, wherein the second control interface for controlling the first testing session in which the first software application is executed in the first testing environment enables a user of the second client computing device to view and interact with the first software application in the first testing environment.

15. The system of claim 1, wherein the second control interface for controlling the first testing session in which the first software application is executed in the first testing environment enables a user of the second client computing device to view and interact with the first software application while the first software application is executed in the first testing environment during a shared session with a user of the first client computing device.

16. A method, comprising:
    at a computing platform comprising at least one processor, memory, and a communication interface:
    receiving, by the at least one processor, via the communication interface, and from a first client computing device, a first software application;
    receiving, by the at least one processor, via the communication interface, and from the first client computing device, a first set of one or more testing parameters for testing the first software application;
    creating, by the at least one processor, based on the first set of one or more testing parameters for testing the first software application, a first testing environment for the first software application using a native hardware layer that represents hardware on which the first software application is configured to be executed, wherein creating the first testing environment for the first software application comprises initializing a virtual machine based on the first set of one or more testing parameters for testing the first software application;

initiating, by the at least one processor, a first testing session in which the first software application is executed in the first testing environment;

providing, by the at least one processor, via the communication interface, and to the first client computing device, a first control interface for controlling the first testing session;

receiving, by the at least one processor, via the communication interface, and from the first client computing device, a request to share the first testing session in which the first software application is executed in the first testing environment;

based on receiving the request to share the first testing session, providing, by the at least one processor, via the communication interface, and to a second client computing device different from the first client computing device, a second control interface for controlling the first testing session in which the first software application is executed in the first testing environment; and prior to providing the second control interface for controlling the first testing session in which the first software application is executed in the first testing environment to the second client computing device:
sending, by the at least one processor, via the communication interface, to the second client computing device, an invitation to share the first testing session;
receiving, by the at least one processor, via the communication interface, from the second client computing device, a connection request; and
based on receiving the connection request from the second client computing device, authenticating, by the at least one processor, a user of the second client computing device.

17. The method of claim 16, wherein the first set of one or more testing parameters for testing the first software application comprises one or more of an operating system version parameter, a firmware version parameter, a screen size parameter, a screen resolution parameter, or an available virtual hardware parameter.

18. The method of claim 16, wherein the native hardware layer comprises one or more processing cores associated with one or more mobile communication devices on which the first software application is configured to be executed.

19. The method of claim 16, wherein the hardware on which the first software application is configured to be executed is different from hardware associated with the first client computing device.

20. One or more non-transitory computer-readable media comprising instructions that, when executed by a computing platform comprising at least one processor, memory, and a communication interface, cause the computing platform to:
receive, via the communication interface, and from a first client computing device, a first software application;
receive, via the communication interface, and from the first client computing device, a first set of one or more testing parameters for testing the first software application;
create, based on the first set of one or more testing parameters for testing the first software application, a first testing environment for the first software application using a native hardware layer that represents hardware on which the first software application is configured to be executed, wherein creating the first testing environment for the first software application comprises initializing a virtual machine based on the first set of one or more testing parameters for testing the first software application;
initiate a first testing session in which the first software application is executed in the first testing environment;
provide, via the communication interface, and to the first client computing device, a first control interface for controlling the first testing session;
receive, via the communication interface, and from the first client computing device, a request to share the first testing session in which the first software application is executed in the first testing environment;
based on receiving the request to share the first testing session, provide, via the communication interface, and to a second client computing device different from the first client computing device, a second control interface for controlling the first testing session in which the first software application is executed in the first testing environment; and
prior to providing the second control interface for controlling the first testing session in which the first software application is executed in the first testing environment to the second client computing device:
send, via the communication interface, to the second client computing device, an invitation to share the first testing session;
receive, via the communication interface, from the second client computing device, a connection request; and
based on receiving the connection request from the second client computing device, authenticate a user of the second client computing device.

* * * * *